United States Patent
Gokhale et al.

(10) Patent No.: US 12,311,974 B2
(45) Date of Patent: May 27, 2025

(54) VERIFICATION OF VEHICLE PREDICTION FUNCTION

(71) Applicant: HITACHI ASTEMO, LTD., Ibaraki (JP)

(72) Inventors: Akshay Vijay Gokhale, Farmington Hills, MI (US); Subrata Kumar Kundu, Canton, MI (US); Yashodeep Dilip Lonari, Novi, MI (US)

(73) Assignee: HITACHI ASTEMO, LTD., Ibaraki (JP)

( * ) Notice: Subject to any disclaimer, the term of this patent is extended or adjusted under 35 U.S.C. 154(b) by 268 days.

(21) Appl. No.: 17/894,006

(22) Filed: Aug. 23, 2022

(65) Prior Publication Data

US 2024/0067216 A1 Feb. 29, 2024

(51) Int. Cl.
*B60W 60/00* (2020.01)
*B60W 40/09* (2012.01)

(52) U.S. Cl.
CPC ........ *B60W 60/0015* (2020.02); *B60W 40/09* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 10,824,151 B2 | 11/2020 | Kim et al. | |
| 2019/0220011 A1* | 7/2019 | Della Penna | ........ G07C 5/0841 |
| 2019/0311272 A1 | 10/2019 | Kamata et al. | |
| 2020/0151611 A1* | 5/2020 | McGavran | ........... G09B 29/102 |
| 2020/0293057 A1* | 9/2020 | Reid | ....................... G06N 20/20 |
| 2020/0326696 A1 | 10/2020 | Alvarez et al. | |
| 2023/0192077 A1* | 6/2023 | Tairbekov | ......... B60W 30/0956 |
| | | | 701/301 |
| 2023/0401591 A1* | 12/2023 | Janani | ................ G06Q 30/0203 |

FOREIGN PATENT DOCUMENTS

| | | |
|---|---|---|
| JP | 2020026985 A | 2/2020 |
| JP | 2020104822 A | 7/2020 |

* cited by examiner

*Primary Examiner* — Daniel L Greene
(74) *Attorney, Agent, or Firm* — MATTINGLY & MALUR, PC

(57) ABSTRACT

In some examples, a system receives sensor data from sensors on board a vehicle. Based at least on the sensor data indicating an anomaly has occurred and is affecting a travel path of the vehicle, an uncertainty threshold is compared with an uncertainty value associated with a prediction model. For instance, the uncertainty value may be indicative of a difference between a predicted value predicted by the prediction model and an actual measured value related to at least one operation parameter of the vehicle. Based at least on determining that the anomaly has occurred and that the uncertainty value is within the uncertainty threshold, sending, by the system, a communication for obtaining an updated prediction model.

20 Claims, 15 Drawing Sheets

VERIFICATION OF VEHICLE PREDICTION FUNCTION

BACKGROUND

Advanced driver assistance systems (ADAS), semi-autonomous vehicle systems, self-driving systems, and otherwise autonomous driving (AD) systems are systems that automate or otherwise enhance vehicle control for improved safety, automated navigation, and the like. ADAS and AD systems are rapidly evolving with a large number of software-based functions being introduced in vehicles to improve safety, comfort, and fuel efficiency. Autonomous driving systems typically utilize data from onboard sensors such as cameras, Lidars, Radars, and the like, for understanding information related to the environment surrounding the vehicle, making plans for navigating in the environment, and sending supervisory control commands to various vehicular systems, such as the powertrain and chassis systems. In turn each of these systems makes decisions using supervisory commands from the AD/ADAS system and in-vehicle sensor data to control the acceleration, steering, and brakes of the vehicle.

SUMMARY

In some implementations, a system may receive sensor data from sensors on board a vehicle. Based at least on the sensor data indicating an anomaly has occurred and is affecting a travel path of the vehicle, an uncertainty threshold is compared with an uncertainty value associated with a prediction model, such as to verify if the prediction function is working correctly. For instance, the uncertainty value may be indicative of a difference between a predicted value predicted by the prediction model and an actual measured value related to at least one operation parameter of the vehicle. Based at least on determining that the anomaly has occurred and that the uncertainty value is within the uncertainty threshold, a false positive in the prediction function can be detected, and sending, by the system, a communication for obtaining a retrained or otherwise updated prediction model.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
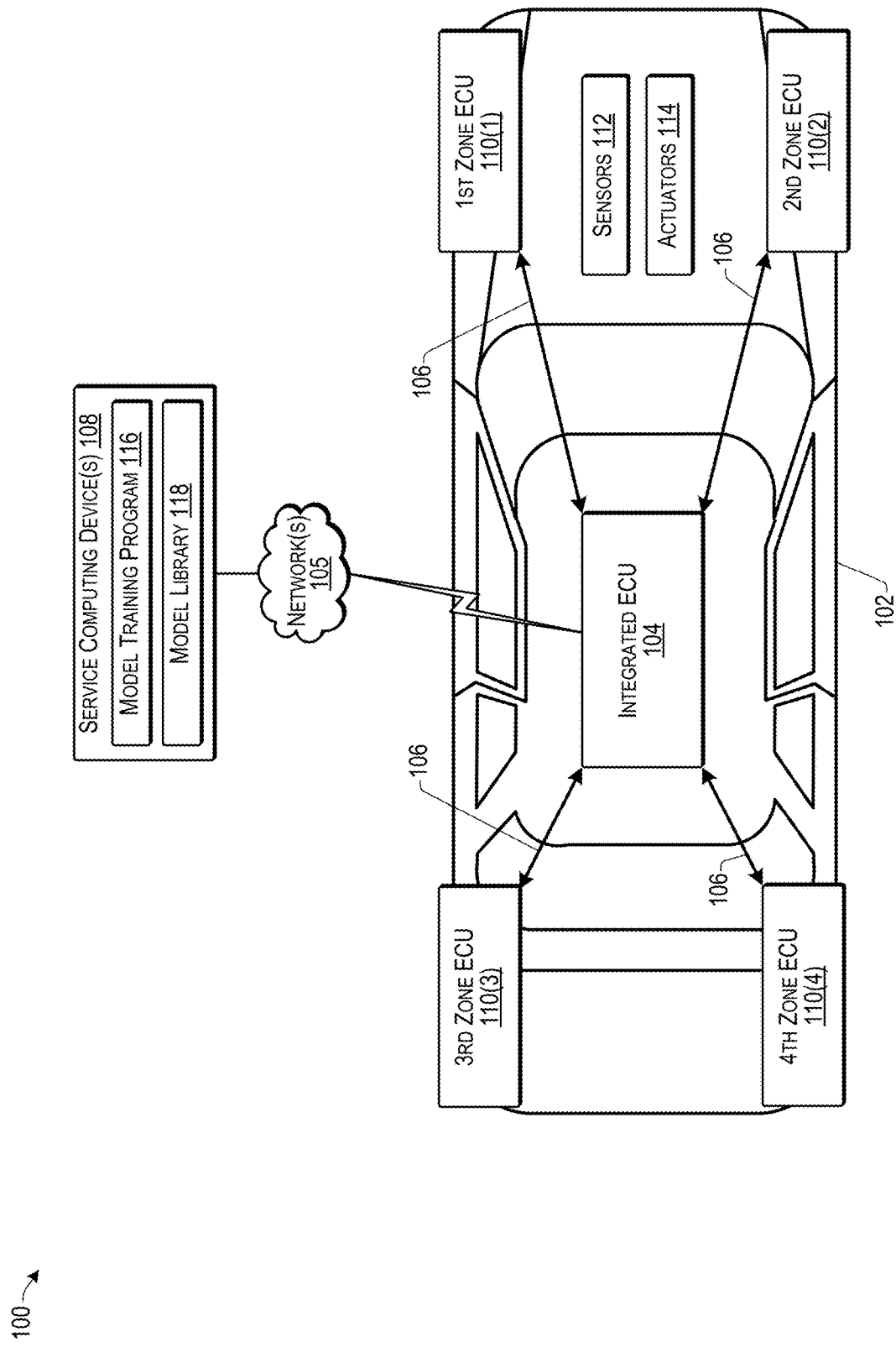
FIG. 1 illustrates an example system able to perform verification of a prediction model in a vehicle according to some implementations.

Some implementations herein are directed to techniques and arrangements for prediction uncertainty verification in an autonomous vehicle, such as by using an integrated electronic control unit (ECU) to enhance the performance of a plurality of zone ECUs. Some examples use recognition information determined based on received sensor information to check the anomalies detected in the environment of an autonomously driving vehicle and/or abrupt actions of the autonomously driving vehicle and other objects in the vicinity of the autonomously driving vehicle. This information may then be used to identify an uncertainty in the autonomously driving vehicle environment. For example, the information can be compared with an uncertainty in a prediction function, such as may be performed by a machine learning model, executed in one or more of the zone ECUs to determine if the prediction model is working correctly. If the uncertainty in a zone ECU prediction function is within the uncertainty threshold, then a false positive is detected in the zone ECU. In such a case, a prediction model used by the zone ECU can be retrained for a given scenario using a remote service computing device, and an updated prediction function is provided to the zone ECU.

Some examples herein include techniques for verifying prediction uncertainty using an integrated ECU to enhance the functionality of zone ECUs. The techniques herein can improve the safety and efficiency of the vehicle, and can also increase the comfort of vehicle passengers. For example, the techniques herein enable the vehicle to better predict traffic density and velocity, to enable better control of the vehicle in response to anomalies such as construction, an accident, a road blockage that is different from information on a map being used by the vehicle for navigation, an unexpected change in weather or in other driving conditions detected by one or more of the sensors on board the vehicle, or the like.

Additionally, the techniques herein may be employed with various ECU architectures such as zone, integrated, or other ECUs to improve the performance of the respective ECU, and depending on where the prediction function is performed. Further, some examples herein may verify cross-domain uncertainty predictions in literature using environmental information obtained from onboard sensors on board the vehicle. Accordingly, examples herein may provide significant benefits to current and future connected automated vehicles. For instance, examples herein may verify reliability of various mixed domain functions to enhance safety, comfort, and efficiency instead of just relying on typical application programming interfaces (APIs) for function integration. Furthermore, if the multi-domain functions are implemented in the integrated ECU, the system may be scaled to improve the performance of the integrated ECU itself.

Some implementations take into consideration the effect of environmental uncertainty on a machine learning prediction model. Additionally, some implementations use perception information (e.g., sensor data) to estimate an anomaly and to verify whether the machine learning model is working correctly. The prediction uncertainty verification may be performed using the integrated ECU, e.g., the prediction system uncertainty may be received as feedback to the integrated ECU from the zone ECUs (or other ECUs) such as over ethernet protocol or other communication network or link. The verification may be performed continually by the integrated ECU to detect normal conditions, false positive conditions, and false negative conditions. Additionally, the integrated ECU may store predicted values and uncertainty values within a local memory on board the vehicle to verify system performance.

Some examples herein improve the system-level performance of an autonomously driving vehicle by using received onboard sensor data to verify the reliability of the cross-domain prediction functions executed by one or more zone ECUs. For instance, in a conventional autonomous driving ECU, various sensor data is processed and the results are used to control the steering, brake, and acceleration of the autonomous vehicle, while domain ECUs may execute independently, such as to determine information for controlling the powertrain, suspension, brakes, steering, etc., but there is no feedback mechanism to verify the domain ECUs or performance of these ECUs, and thus, the accuracy and reliability of such functions is not verified. On the other hand, implementations herein are able to receive feedback from zone ECUs and determine whether machine learning prediction models executed by the respective zone ECUs are functioning properly or alternatively, need to be retrained or otherwise updated.

For discussion purposes, some example implementations are described in the environment of determining an uncertainty associated with a prediction model executed on a vehicle ECU. However, implementations herein are not limited to the particular examples provided, and may be extended to other types of ECU and system configurations, other types of vehicles, other types of machine learning models, and so forth, as will be apparent to those of skill in the art in light of the disclosure herein.

FIG. 1 illustrates an example system 100 able to perform verification of a prediction model in a vehicle according to some implementations. In this example, a vehicle 102 includes an integrated ECU 104 (also referred to a central or primary ECU) able to communicate over one or more networks 105 with a service computing device 108, and also able to communicate over one or more communication links 106 on the vehicle 102 with a plurality of zone ECUs 110(1)-110(4). Further, while four zone ECUs 110(1)-110(4) are illustrated in this example, in other examples, there may be more or fewer zone ECUs 110.

In addition, the integrated ECU 104 and/or the zone ECUs 110 are able to communicate over the one or more communication links 106 with onboard sensors 112 and/or actuators 114. For example, the onboard sensors 112 may provide sensor data regarding the environment surrounding the vehicle 102. Further, the actuators 114 may receive one or more control signals from the integrated ECU 104 and/or one or more of the zone ECUs 110 based on results of sensor data processing performed by the integrated ECU 104 and/or the zone ECUs 110. For instance, the system 100 may be included in a vehicle 102 that has actuators 114 that can control some or all aspects of vehicle operation, such as steering, brakes, acceleration, signaling, lighting, and so forth.

Examples of sensors 112 may typically include one or more of cameras (mono and/or stereo, visible light and/or near infrared), lidar sensors, radar sensors, ultrasonic sensors, thermal imaging sensors, a Global Navigation Satellite System (GNSS) sensor or other position sensor, a steering wheel position sensor (or a front wheel position sensor in the case that there is no steering wheel in the vehicle), a vehicle speed sensor; and various other vehicle condition sensors, as is known in the art. Furthermore, in some examples, some sensors 112 may provide sensor data directly to the integrated ECU 104, and other sensors 112 may provide their sensor data to one or more of the zone ECUs 110. Numerous variations will be apparent to those of skill in the art having the benefit of the disclosure herein.

The zone ECUs 110 are able to communicate with the integrated ECU 104 and, in some examples, each other, over the communication links 106. For instance, vehicle ECUs 104, 110 may typically communicate with each other, the sensors 112, and the actuators 114 over a wired connection, such as a vehicle bus according to a vehicle bus protocol, Ethernet connections, or any other suitable protocol. As an example, the communication links 106 may include a Controller Area Network bus (CAN bus) that enables communication according to the CAN bus protocol. The CAN bus protocol is a vehicle bus protocol that allows ECUs and other vehicle devices and systems to communicate with each other without a host computer. Furthermore, the communication links 106 are not limited to a CAN bus protocol, and may include other types of wired and wireless networking technologies, such as Ethernet, fiber optics, Wi-Fi or other short range wireless technology, and so forth. Consequently, implementations herein are not limited to any particular networking technology or protocol.

In addition, at least the integrated ECU 104, and in some examples, the zone ECUs 110 may communicate over the one or more networks 105 with the one or more service computing device 108, which are remote from the vehicle 102, i.e., not located on board the vehicle 102. As an example, the one or more service computing devices 102 may include cloud servers, edge servers, combinations thereof, or other suitable computing devices. The service computing device(s) 108 may maintain, or may access, a model training program 116, and in some examples, a model library 118, each of which is discussed additionally below.

The one or more networks 105, or portions thereof, may include any appropriate network, including a wireless network, such as a cellular network; other radio networks, such as V2V, a wide area network, such as the Internet; a local area network, such an intranet; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail.

As defined by the Society of Automotive Engineers (SAE), there are six levels of driving automation from Level 0 to Level 5. In particular, at "Level 0" (no driving automation) the driver performs all operating tasks such as steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control is one example of Level 2 autonomy.

The concept of autonomous driving mainly starts from "Level 3" (conditional driving automation), in which the vehicle itself may monitor the surroundings and may exert some control over the vehicle (e.g., automatic emergency braking). At "Level 4" (high driving automation) a vehicle may be able to drive independently most of the time but will not operate unless all conditions are met and an operator is still required to be able to take over. At "Level 5" (full driving automation) the vehicle is able to drive anywhere in all conditions without an operator. Some examples herein may be useful for level 3-4 driving automation systems. Further some examples herein may be useful for level 5 autonomous driving vehicles.

As one example, an autonomous driving system for the vehicle 102 may include three major functions, namely, perception, cognition, and control. The perception function may include receiving on-board vehicle sensor data such as from cameras, lidar, radar, and/or other sensors. The sensor data is then processed using conventional and/or machine learning algorithms to identify obstacles, pedestrians, road signs, road features, traffic lights, and so forth. Based on the recognition information, the cognition function can make driving plans and generate safe drivable trajectories for the vehicle 102. The trajectories may then be used to generate the control signals such as acceleration instructions, braking instruction, steering instructions, and the like, for following a determined trajectory. The control signals are sent to various vehicle systems for execution.

For instance, a powertrain system may receive an acceleration control signal from the autonomous driving system. Additionally, the powertrain system may receive data such as current engine rpm, vehicle speed, gear position, and other vehicle dynamics information from in-vehicle sensors. Using this information, the powertrains system sends the torque demand to the engine for execution. The chassis system may include multiple controllers such as brakes, steering, suspension etc. The brake controller in the chassis system receives the brake command from the autonomous driving system, and may also receive in-vehicle sensor information such as current brake pressure, engine rpm, vehicle speed, other vehicle dynamics etc. The brake system estimates the target brake pressure based on the above-mentioned information. Whereas the steering controller estimates the target steering torque from the steering command received from AD system and in-vehicle sensor information such as steering torque, steering angle, other vehicle dynamics etc.

Figure 2:
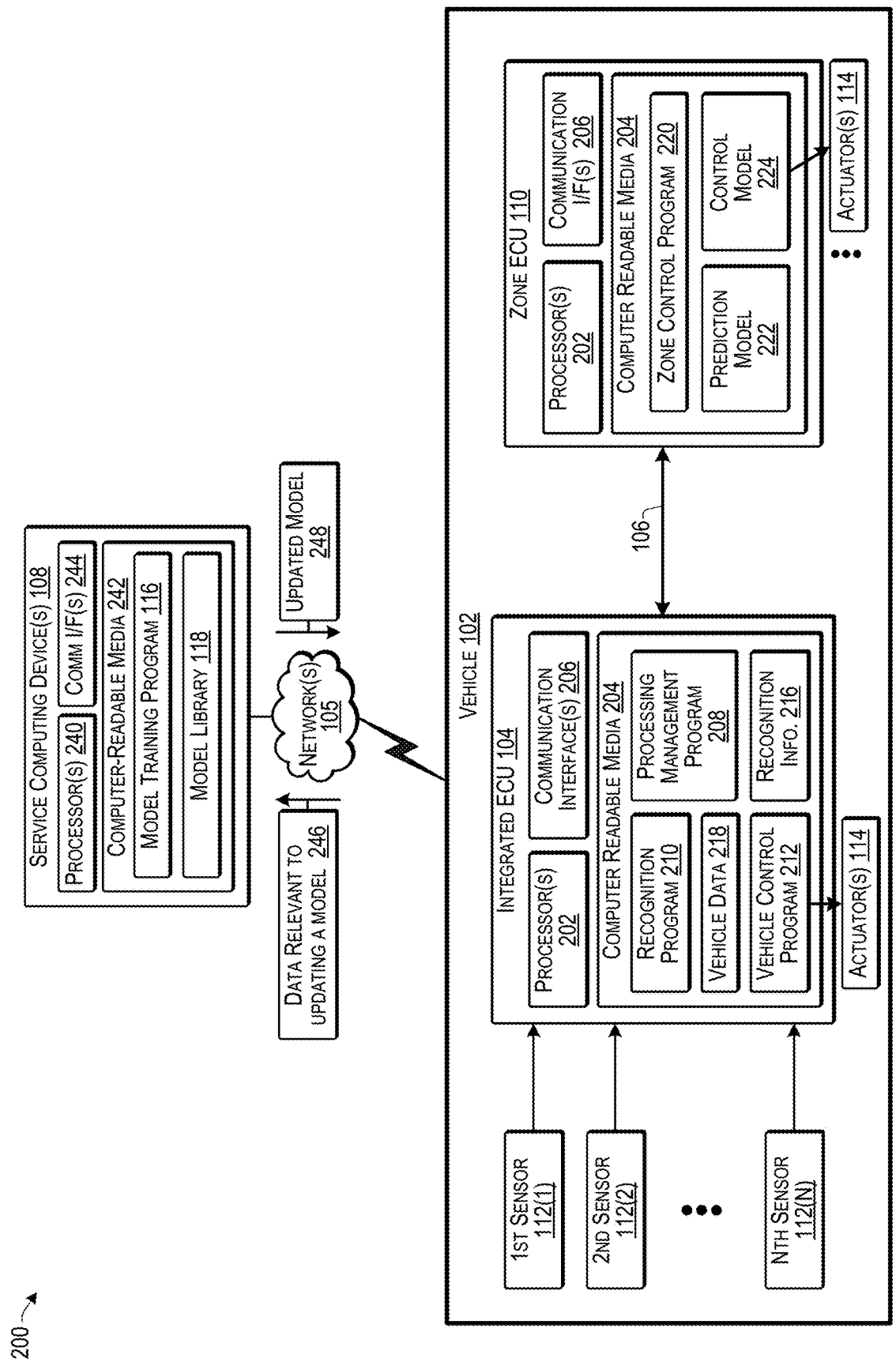
FIG. 2 illustrates an example physical and logical architecture of the system of FIG. 1 according to some implementations.

FIG. 2 illustrates an example physical and logical architecture 200 of the system 100 of FIG. 1 according to some implementations. ECU is a generic term for an embedded system that controls one or more of the systems, subsystems, or components in a vehicle. Software may be executed by the ECUs 104, 110, and may be stored in a portion of a computer-readable medium (e.g., program ROM) associated with the respective ECU 104, 110 to enable the ECU 104, 110 to operate as an embedded system.

In this example, the integrated ECU 104 includes one or more processors 202, one or more computer-readable media 204, and one or more communication interfaces 206. The one or more processors 202 may include a single processing unit or a number of processing units, and may include single or multiple computing units or multiple processing cores. For example, the one or more processors 202 may include one or more of central processing units (CPUs), system-on-chip (SOC) processors, graphics processing units (GPUs), microprocessors, microcomputers, microcontrollers, digital signal processors, state machines, logic circuits, and/or other devices that manipulate signals based on operational instructions. As one example, the processor(s) 202 may include one or more hardware processors and/or logic circuits of any suitable type specifically programmed or configured to execute the algorithms and other processes described herein. The processor(s) 202 may be configured to fetch and execute computer-readable instructions stored in the computer-readable media 204, which may program the processor(s) 202 to perform the functions described herein.

The computer-readable media 204 may include volatile and nonvolatile memory and/or removable and non-removable media implemented in any type of technology for storage of information, such as computer-readable instructions, data structures, programs, program modules, and other code or data. For example, the computer-readable media 204 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the integrated ECU 104, the computer-readable media 204 may be a tangible non-transitory medium to the extent that, when mentioned, non-transitory computer-readable media exclude media such as energy, carrier signals, electromagnetic waves, and/or signals per sec. In some cases, the computer-readable media 204 may be at the same location as the integrated ECU 104, while in other examples, the computer-readable media 204 may be partially remote from the integrated ECU 104, such as accessible over a wireless network or the like, such as the one or more networks 105.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the integrated ECU 104. Functional components stored in the computer-readable media 204 may include a processing management program 208, a recognition program 210, and a vehicle control program 212, each of which may include one or more computer programs, applications, executable code, or portions thereof. While these programs 208, 210, 212 are illustrated as separate programs in this example, some or all of these programs may be combined into one or more programs, or divided into a larger number of programs, or the like. Operations performed through execution of these programs 208, 210, 212 are discussed additionally below.

In addition, the computer-readable media 204 may store data, data structures, and other information used for performing the functions and services described herein. For example, the computer-readable media 204 may store, at least temporarily, recognition information 216. Further, the computer readable media may store vehicle data 218 that may be used by the vehicle, such as when communicating with the service computing device(s) 108 and/or other vehicles. The integrated ECU 104 may also include or maintain other functional components and data, which may include other programs, drivers, etc., and the data used or generated by the functional components. Further, the integrated ECU 104 may include many other logical, programmatic, and physical components, of which those described above are merely examples that are related to the discussion herein.

The one or more communication interfaces 206 may include one or more software and hardware components for enabling communication with various other devices, such as over the communication links 106 and/or over a cellular network or other wireless communication network for communicating with the service computing device(s) 108, other vehicles, and the like. For example, the communication interface(s) 206 may enable communication through one or more of a LAN, the Internet, cable networks, cellular networks, other radio networks, other wireless networks (e.g., Wi-Fi) and wired networks (e.g., CAN, fiber optic, Ethernet), direct connections, as well as close-range communications such as BLUETOOTH®, and the like.

The zone ECUs 110 may each have a hardware configuration similar to that of the integrated ECU 104, including one or more processors 202, one or more computer-readable media 204, and one or more communication interfaces 206. In some examples, the zone ECUs 110 may have a lower overall performance as compared to the integrated ECU 104, including lower performance components such as a lower performance processor 202 having a lower clock speed, lower performance memory, a smaller quantity of memory and other computer readable media, and so forth. Accordingly, the data processing capability of the respective zone ECUs 110 may be lower than that of the integrated ECU 104. In some examples herein, the integrated ECU 104 may include multiple high-performance system-on-chip processing units connected with each other with high-speed communication networks, such as PCIe or multi-gigabit Ethernet, and the zone ECUs 110 may also include one or more system-on-chip processors. Furthermore, the integrated ECU 104 may be connected to the zone ECUs with a high-speed communication network or other communication link 106, such as multi-gigabit Ethernet.

Furthermore, the zone ECUs 110 may include functional components and data that are different from those of the integrated ECU 104. For example, the zone ECUs 110 may execute a respective zone control program 220, a prediction model 222, and a control model 224. For example, the zone ECU 110 may execute the prediction model 222 to perform one or more prediction functions such as for predicting speed, trajectory, traffic density, steering command, suspension damping command, traffic patterns, or the like, for improving safety, comfort, and fuel economy of an autonomously driving vehicle, such as the vehicle 102 in some examples herein. The prediction model 222 may utilize in-vehicle sensor and historical data to make predictions of control parameters a few timesteps ahead and to provide enhanced control for the vehicle 102. The prediction model 222 in this example is implemented on one or more of the zone ECUs 110 for real-time execution to provide a statistical approximation of real-world phenomena.

The prediction performed by the prediction model 222 may be inherently uncertain and may lead to errors in judgment in discreet scenarios. Accordingly, in the examples herein, the prediction model 222 may be updated, such as by being retrained, when it is determined that the prediction model 222 may not be performing accurately, such as in the case of the occurrence of an anomaly. Examples of anomalies may include construction, an accident, a road blockage that is different from information on a map being used by the vehicle 102 for navigation, an unexpected change in weather or in other driving conditions detected by one or more of the sensors on board the vehicle 102, or the like. Additionally, while the prediction model 222 is illustrated as being executed on one or more zone ECUs 110 in this example, in other examples, the prediction model 222 may be executed on the integrated ECU 104 or in another ECU on board the vehicle 102.

As one non-limiting example, the prediction model 222 may include a speed prediction model that may be used, e.g., to predict a speed of the vehicle for powertrain control. The speed prediction model may receive inputs such as map data, a real-time speed forecast for a given horizon, and vehicle dynamics information from the in-vehicle sensor data. Based on these inputs, the speed prediction model may be trained to predict the speed of the vehicle 102 a few timesteps ahead of a current time, such as a two seconds, five seconds, ten seconds, etc. As one example, the speed prediction model may employ machine learning techniques such as a neural network. The speed prediction model may provide a predicted speed for an upcoming time that may be used to significantly improve the energy efficiency and safety of the vehicle, such as by, e.g., beginning to slow the vehicle or ceasing acceleration of the vehicle when the speed of the vehicle is predicted to decrease in during the upcoming time period, or, alternatively, beginning to accelerate the vehicle when the speed is predicted to increase during the upcoming time period. Long and accurate speed prediction may provide greater benefits; however, the speed prediction model may be affected by the occurrence of anomalies on the travel path, such as an accident, change in weather conditions, or the like, as listed elsewhere herein.

In some examples, the predicted speed that is predicted for the upcoming time may be stored in a memory on board the vehicle, and the stored values may be used to estimate the uncertainty of the speed prediction. Additionally, speed prediction can also be used to enhance smooth brake control. In some cases, the speed prediction may include a simple statistical approximation of a real-world phenomenon and may be affected by errors in input data or discrete event occurrences, such as accidents, lane closures, weather conditions, or other anomalies, as listed elsewhere herein. The uncertainty of the predicted speed can increase in such scenarios. Incorrect estimation of uncertainty can affect the control system negatively. Accordingly, the examples herein may determine the reliability of the prediction model in real-time, such as for improving the effectiveness of control of the vehicle 102.

The system 200 of FIG. 2 may be configured to verify the prediction model reliability by considering both external factors, such as environmental induced uncertainty, as well as internal factors, such as uncertainty due to a faulty sensor or an incorrect input. Thus, the system herein may evaluate the performance of the prediction, such as in the case of environmental uncertainty. For example, environmental uncertainty can cause hazards in safety critical prediction functions such as trajectory prediction, suspension damping force prediction, and/or speed prediction. Additionally, implementations herein may determine the performance of the model itself and hence may enhance the performance of the ECU that executes the prediction model 222. Furthermore, implementations herein may contribute to improvements in safety, efficiency, and comfort of autonomously driving vehicles.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, an edge server, and so forth, although other computer architectures may additionally or alternatively be used.

Further, while the figures illustrate the functional components and data of the service computing device(s) 108 as being present in a single location, these components and data may alternatively be distributed across different computing devices and different locations in any manner. Consequently, the functions may be implemented by one or more service computing devices 108, with the various functionality described herein distributed in various ways across the different service computing devices 108. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 240, one or more computer-readable media 242, and one or more communication interfaces (I/Fs) 244. Each processor 240 may be a single processing unit or a number of processing units, and may include single or multiple computing units or multiple processing cores. The processor(s) 240 can be implemented as one or more microprocessors, microcomputers, microcontrollers, digital signal processors, central processing units, graphics processing units, system-on-chip processing units, state machines, logic circuitries, and/or any devices that manipulate signals based on operational instructions. For instance, the processor(s) 240 may be one or more hardware processors and/or logic circuits of any suitable type specifically programmed or configured to execute the algorithms and processes described herein. The processor(s) 240 can be configured to fetch and execute computer-readable instructions stored in the computer-readable media 242, which can program the processor(s) 240 to perform the functions described herein.

The computer-readable media 242 may include volatile and nonvolatile memory and/or removable and non-removable storage media implemented in any type of technology for storage of information, such as computer-readable instructions, data structures, program modules, or other data. Such computer-readable media 242 may include, but is not limited to, RAM, ROM, EEPROM, flash memory or other memory technology, optical storage, solid state storage, magnetic tape storage, magnetic disk storage, storage arrays, network attached storage, storage area networks, cloud storage, or any other medium that can be used to store the desired information and that can be accessed by a computing device. Depending on the configuration of the service computing device 108, the computer-readable media 242 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 242 may be used to store any number of functional components that are executable by the processors 240. In many implementations, these functional components comprise instructions or programs that are executable by the processors 240 and that, when executed, specifically configure the one or more processors 240 to perform the actions attributed above to the service computing device 108. Functional components stored in the computer-readable media 242 may include the model training program 116. For example, the model training program 116 may receive data 246 relevant to updating the prediction model 222. In particular, when the system 200 determines that the prediction model 222 is not performing properly, the integrated ECU 104 (or a zone ECU 110 in other examples) may send the data 246 relevant to updating the model to the service computing device(s) 108. In response, the model training program may retrain the prediction model 222 in real time, and may send an updated model 248 to the vehicle 102, such as to the integrated ECU 104, or directly to the affected zone ECU 110. The zone ECU 110 may deploy the updated model 248 as the prediction model 222 to execute for performing prediction determination. Further, should the system 200 fail to retrain the prediction model 222, such as in the case that the system 200 tries to retrain the prediction model 222 repeatedly for a predetermined number of times, then the system 200 may give up attempting to retrain the model using the current training data, and may eliminate the data.

As an alternative, the model training program 116 may continually update one or more prediction models 222 at the service computing device(s) 108 without receiving a request from the vehicle 102 for an updated model. For example, the model training program 116 may maintain one or more most recently updated versions of the prediction model 222 in the model library 118. Subsequently, when the service computing device 108 receives the data 246 relevant to updating the model, rather than performing retraining of the prediction model 222 in real time, the model training program 116 may simply retrieve an already updated relevant prediction model from the model library 118, and return the retrieved prediction model as the updated model 248 to the vehicle 102.

In addition, the computer-readable media 242 may store data used for performing the operations described herein. Thus, the computer-readable media 242 may include the model library 118, which may include one or more prediction models that have been recently trained or otherwise updated by execution of the model training program 116. Examples of machine learning models that may be used in some examples herein may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, and so forth. Further, the service computing device 108 may also include or maintain other functional components and data not specifically shown in FIG. 2, which may include programs, drivers, etc., and the data used or generated by the functional components. Additionally, the service computing device 108 may include many other logical, programmatic, and physical components, of which those described above are merely examples that are related to the discussion herein.

The communication interface(s) 244 may include one or more interfaces and hardware components for enabling communication with various other devices, such as over the network(s) 105. For example, communication interface(s)

244 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

In some examples, the vehicle control program 212 may use rule-based and or machine-learning-based control algorithms to determine parameters for controlling the vehicle 102. For instance, based on the recognition information 216 determined by execution of the recognition program 210 by the integrated ECU 104, the vehicle control program 212 may apply one or more of algorithms, machine learning models, and combinations thereof for determining an appropriate action, such as braking, steering, decelerating, accelerating, or the like, as is known in the art. Furthermore, the vehicle control program 212 may send the one or more control signals to one or more of the zone ECUs 110 and/or directly to one or more actuators 114 for the vehicle systems in response to the recognition information 216. In addition, in some examples, a control signal 223 may also be sent to one or more warning devices (not shown in FIG. 2), such as for sounding or displaying a warning to the vehicle occupant.

Further, the zone ECU 110 may execute the control model 224 for determining one or more control signals to send to one or more of the actuators 114 for which the zone ECU 110 may have responsibility. For example, the control model 224 may receive inputs from the vehicle control program 212, the recognition program 210, and/or the prediction model 222, and may send one or more control signals for controlling one or more of the actuators 114 based on these inputs.

Furthermore, the processing management program 208 may be executed to determine whether the prediction model 222 is operating correctly (e.g., within an expected threshold of accuracy). For example, as discussed additionally below, the processing management program 208 may compare an uncertainty in the prediction model 222 with a threshold and based on whether an anomaly has been detected, can determine whether the prediction model 222 is operating correctly.

Figure 3:
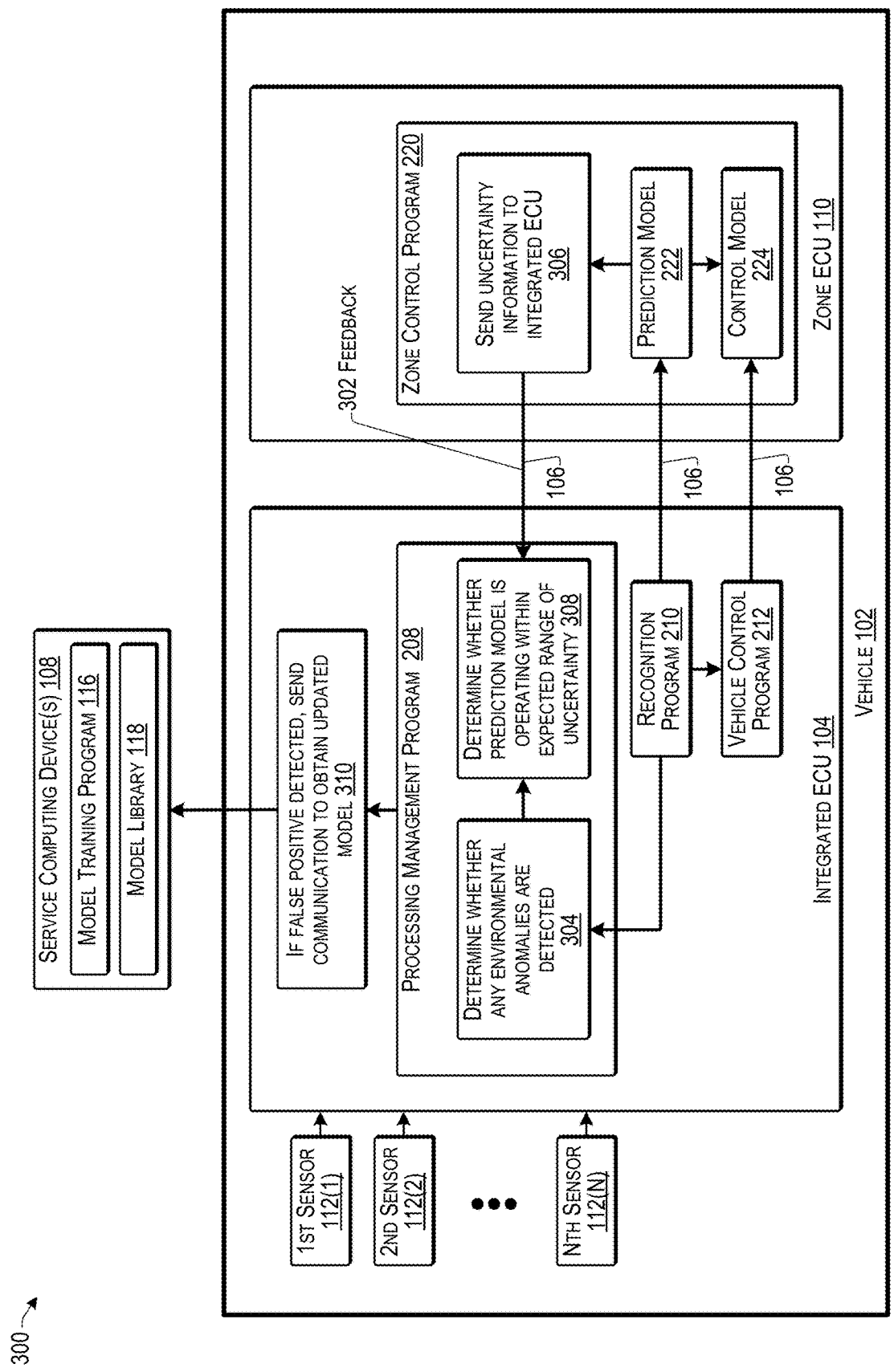
FIG. 3 illustrates an example of using feedback from the prediction model according to some implementations.

FIG. 3 illustrates an example 300 of using feedback from the prediction model according to some implementations. In some examples, the integrated ECU 104 on board the vehicle 102 may receive feedback 302 from the prediction model 222, which can then be used to verify the reliability of the respective prediction model 222 in real time. For example, if the prediction models 222 are implemented in the zone ECUs 110, the uncertainty information can be received through the data links 106 by the processing management program 208 executing on the integrated ECU 104. For performing verification of the prediction model 222, the processing management program 208 may be executed on the integrated ECU to check anomalies in the environment of the vehicle 102, which may include abrupt actions of the vehicle 102 and/or other objects in the vicinity of the vehicle 102. For instance, the verification process may make use of recognition information determined from sensor information processed by the recognition program 210. This information is used to identify the uncertainty in the environment of the vehicle 102. For example, the recognition information may be compared with the occurrence of uncertainty in the prediction model to determine if the prediction model in the zone ECU is working correctly, e.g., within an expected range. Some examples herein use speed prediction as an example for explanation purposes; however, the implementations herein are not limited to any particular prediction system or implementation and may be employed for other prediction functions and models, as well as function allocation strategies.

In some examples herein, uncertainty may be an amount of deviation in prediction due to plausible alternative input values. Uncertainty may increase suddenly in certain scenarios, such as in the case of the occurrence of an anomaly in the environment of the vehicle 102, and the uncertainty can affect the control system parameters used for controlling the vehicle. Causes of uncertainty in a prediction model may be due, in some cases, to a faulty sensor or noisy input data, which can cause uncertainty to increase. Techniques for estimating the uncertainty herein may include storing a predicted vehicle operation parameter value in a local or global memory of a computing device, such as an ECU, and then comparing the stored value with an actual vehicle operation parameter value to estimate an error. A variance in the error (or a deviation in the error) may indicate the uncertainty of the prediction model. For example, in an artificial intelligence model (e.g., a machine learning model) such as for speed prediction or the like, the uncertainty may be automatically estimated by the model itself, such as by using a variational encoder. The variational encoder may store predicted data locally and may reuse the data to estimate a variance in error which indicates the uncertainty of the model.

In some cases, uncertainty may be caused by environmental events, also referred to herein as "anomalies". Examples of anomalies include construction, an accident, a road blockage that is different from information on a map being used by the vehicle for navigation, an unexpected change in weather or in other driving conditions detected by one or more of the sensors on board the vehicle, or the like. Such anomalies may be difficult for a prediction model to handle and typically cannot be estimated statistically.

Some implementations herein are able to determine the cause of environmental uncertainty and may thereby enhance the performance of zone ECU based on information determined by the recognition program 210. In particular, as indicated at 304, examples herein may use recognition information from the recognition program 210 to check for anomalies or abrupt actions of the vehicle 102. Furthermore, as indicated at 306, the zone control program 220 may send uncertainty information to the integrated ECU as the feedback 302. At 308, the processing management program 208 may be executed by the integrated ECU 104 to determine whether the prediction model is operating within an expected range of uncertainty.

The uncertainty in prediction received as the feedback 302 from the zone ECU 110 can be compared with an uncertainty threshold to enable a determination as to whether the performance of the prediction model 222 at the zone ECU 110 is correct. For example, if the prediction model 222 at the zone ECU 110 indicates an uncertainty that is below the threshold when there is an anomaly detected, this indicates a false positive. As indicated at 310, in the case of a false positive, the prediction model is determined to not be operating correctly, and a communication may be sent to the service computing device to obtain an updated prediction model. For example, the prediction model may be updated by retraining in real time, or an already updated model may be obtained from the model library 118 at the service computing device 108.

Alternatively, in the case in which there is not an anomaly detected, but the uncertainty exceeds the threshold, this indicates a false negative which indicates that there may be a different source of uncertainty that is not related to the environment of the vehicle. As a third alternative, when there is an anomaly detected and the uncertainty exceeds the threshold, then the prediction model may be determined to be operating correctly.

Figure 4:
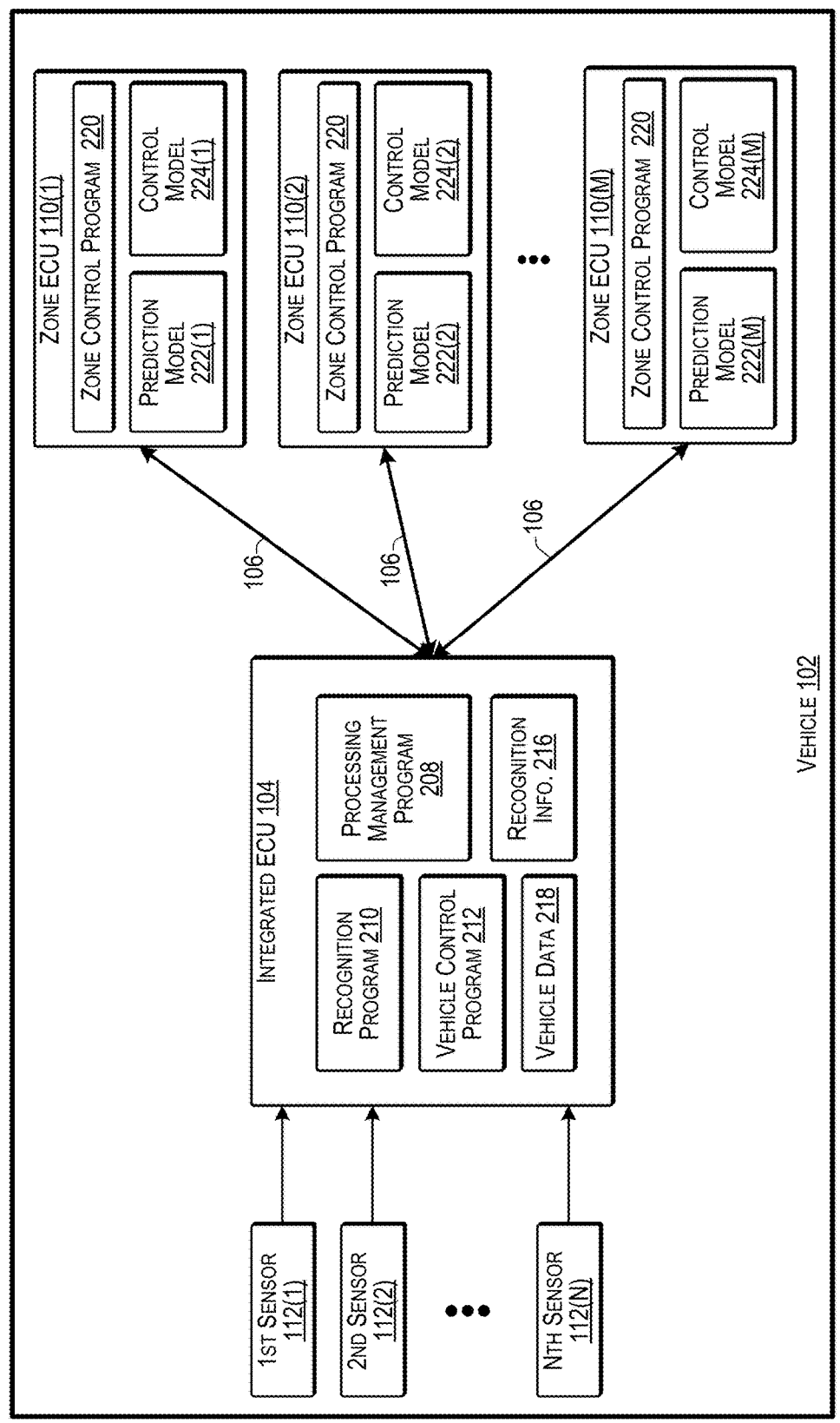
FIG. 4 illustrates an example arrangement of a plurality of prediction models according to some implementations.

FIG. 4 illustrates an example arrangement 400 of a plurality of prediction models according to some implementations. In this example, the vehicle 102 includes a plurality of the zone ECUs 110(1), 110(2), . . . , 110(M) in communication with the integrated ECU 104. For example, each zone ECU 110 may have an associated prediction model 222 and control model 224, which may perform different functions from those of the other zone ECUs 110. Accordingly, the first zone ECU 110(1) may include a prediction model 222(1) and a control model 224(1); the second zone ECU 110(2) may include a prediction model 222(2) and a control model 224(2); and the zone ECU 110(M) may include a prediction model 222(M) and a control model 224(M). Accordingly, each zone ECU 110 may control different functions and/or actuators on board the vehicle 102. Furthermore, the integrated ECU 104 may execute the processing management program 228 to verify the correct function of each of the prediction models 222, such as discussed above with respect to FIG. 3.

Figure 5:
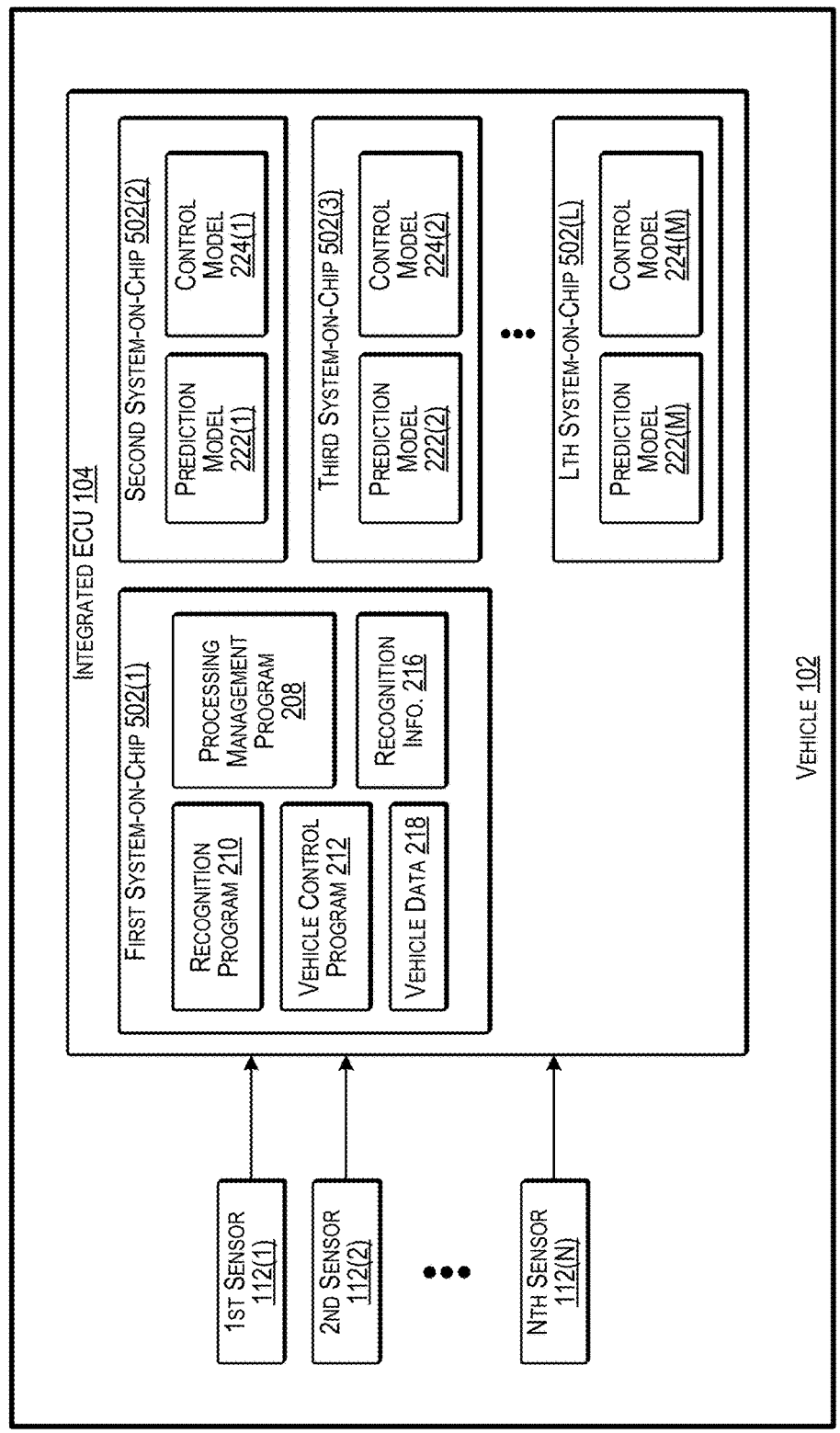
FIG. 5 illustrates an example arrangement of a plurality of prediction models according to some implementations.

FIG. 5 illustrates an example arrangement 500 of a plurality of prediction models according to some implementations. In this example, rather than employing zone ECUs for executing the prediction models, the integrated ECU 104 may include a plurality of system-on-chip processors such as a first system-on-chip 502(1), a second system-on-chip 502(2), a third system-on-chip 502(3), . . . , and an Lth system-on-chip 502(L). For instance, the first system-on-chip 502(1) may execute the recognition program 210, the vehicle control program 212, and the processing management program 208. Additionally, the second system-on-chip 502(2) may execute the prediction model 222(1) and the control model 224(1); the third system-on-chip 502(3) may execute the prediction model 222(2) in the control model 224(2); . . . , and the Lth system-on-chip 502(L) may execute the prediction model 222(M) and the control model 224(M). Similar to the example discussed above with respect to FIG. 4, each prediction model 222(1)-222(M) may perform a different type of prediction, and each control model 224(1)-224(M) may control a different actuator, system or the like. Furthermore, in some examples, depending on the function allocation more than one prediction model 222 and/or control model 224 may be executed on a single system-on-chip 502. Here for example a particular system-on-chip 502 might be used for a specific system to provide real-time control and each of the prediction models may provide feedback of uncertainty values to the first system-on-chip 502(1) using internal high-speed communication network, such as a high-speed bus (not shown in FIG. 5).

FIGS. 6, 8, and 10-13 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 6:
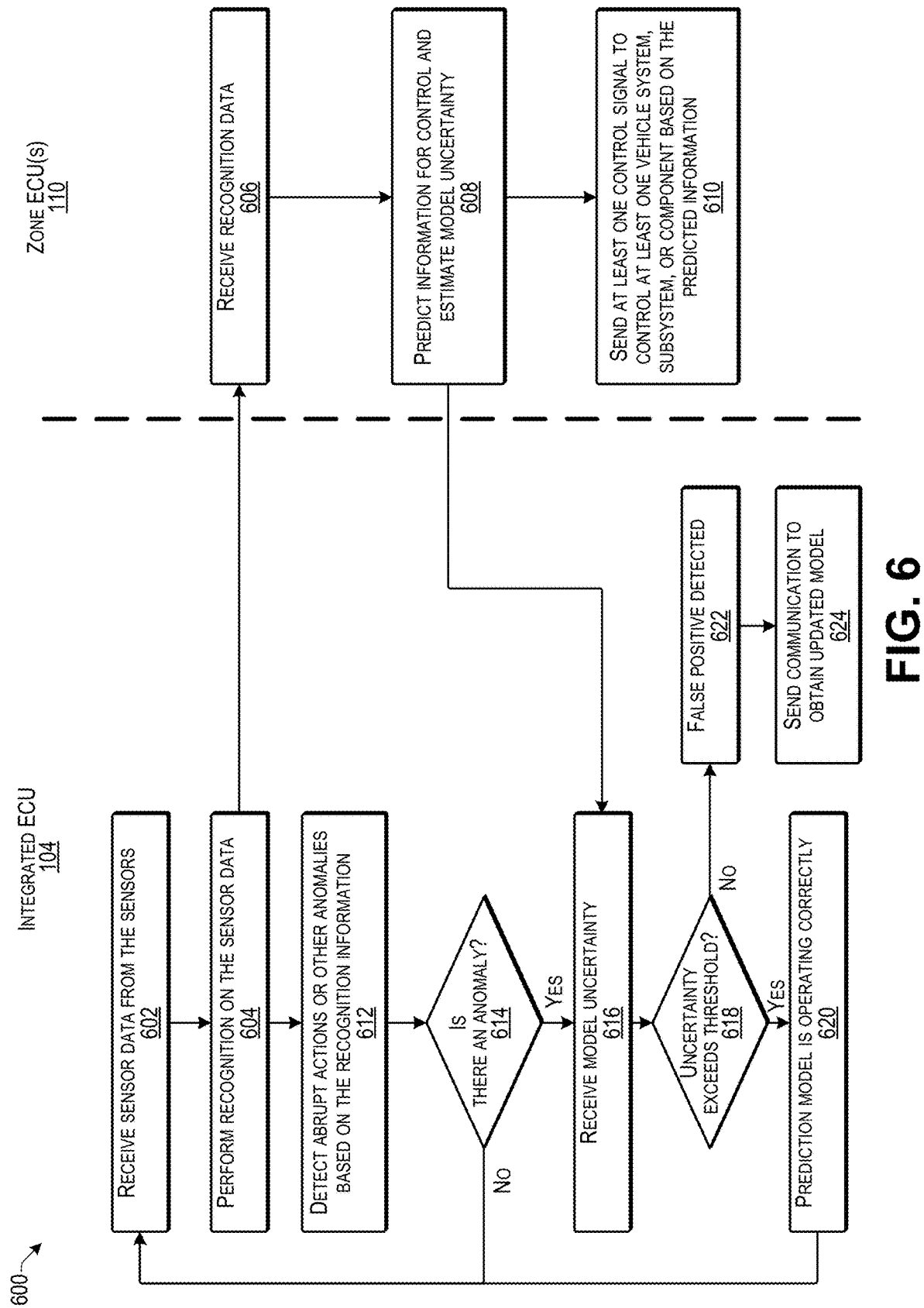
FIG. 6 is a flow diagram illustrating an example process for verifying a prediction model uncertainty according to some implementations.

FIG. 6 is a flow diagram illustrating an example process 600 for verifying a prediction model uncertainty according to some implementations. As mentioned above, the integrated ECU 104 may receive the onboard sensor data and translates the raw data into recognition information, such as obstacle positions, velocity, distance, trajectory of travel, information regarding traffic signs, signals, pedestrians, and so forth. This information may then be used for anomaly detection, such as to generate contextual information and detect anomalies in the environment surrounding the vehicle and/or for detecting abrupt actions of the vehicle.

In this example, the process 600 may be executed by the system 100 discussed above. For example, a portion of the process 600 may be executed by the integrated ECU 104, and another portion of the process 600 may be executed by the zone ECU(s) 110, as indicated by the vertical dashed line separating the respective operations. Furthermore, while in this example, certain functions are being illustrated as being performed by one or the other of the ECUs 104 or 110, respectively, it will be readily apparent to those of skill in the art having the benefit of the disclosure herein that some or all of the functions may be performed by the other one of the ECUs 104 or 110.

At 602, the integrated ECU 104 may receive sensor data from the sensors. For example, as discussed above, the integrated ECU may receive sensor data such as camera images, radar information, lidar information, or the like.

At 604, the integrated ECU 104 may perform recognition on the received sensor data. For example, as is known in the art the integrated ECU may use recognition algorithms and/or machine learning models for recognizing objects, street signs, traffic signals, pedestrians, and the like in the area surrounding the vehicle. The recognition information may be sent to the zone ECU 110.

At 606, the zone ECU 110 may receive the recognition information from the integrated ECU 104.

At 608, the zone ECU 110 may input the recognition information into the prediction model to predict information for control of one or more systems, subsystems, or components of the vehicle. The prediction model may also provide an estimate of model uncertainty as part of its output.

At 610, the zone ECU 110 may send at least one control signal to control at least one vehicle system, subsystem, or component based on the prediction information output by the prediction model.

At 612, in parallel with the operations performed on the zone ECU 110, the integrated ECU 104 may analyze the recognition information determined at 604 to detect any abrupt actions or other anomalies based on the recognition information.

At 614, the integrated ECU 104 may determine whether an anomaly was detected in the recognition information. If so, the process goes to 616. If not, the process returns to 602 to receive additional sensor data.

At 616, the integrated ECU may receive the prediction model uncertainty from the zone ECU 110. For example, when an anomaly has been detected at 614, the integrated ECU may request, from the zone ECU 110, the model uncertainty value from the prediction model for the most recent prediction corresponding to the recognition data indicating the anomaly.

At 618, the integrated ECU 104 may compare the model uncertainty value with a predefined uncertainty threshold to determine whether the received model uncertainty value exceeds the uncertainty threshold. If so, the process goes to 620. If not, the process goes to 622.

At 620, when the uncertainty value exceeds the uncertainty threshold, the prediction model is assumed to be working as desired. As one example, this may be due to the prediction model being a simple approximation of real-world phenomenon that might not work accurately outside of its designed domain as defined during the model training by the training dataset.

At 622, on the other hand, if the uncertainty value is less than the uncertainty threshold when an anomaly has been detected, the prediction model may be considered to be working incorrectly (i.e., a false positive is detected). In this case, it may be desirable to update the prediction model for improving the accuracy thereof.

At 624, the integrated ECU 104 may send a communication to obtain an updated prediction model. For example, the prediction model may be retrained by the service computing device using the collected sensor data and/or recognition data as a part of updated training data used for updating the prediction model. The service computing device may retrain the prediction model using the updated training data set and verify the model's performance using an updated test data set prior to sending the updated model to the vehicle 102. Alternatively, in other examples, an updated model may already be present in a model library maintained by the service computing device 108. For example, the vehicle 102 and other autonomous vehicles may continually provide data to the service computing device(s) 108 to enable the service computing device(s) 108 to continually train and update prediction models and store the updated prediction models in the model library 118.

Figure 7:
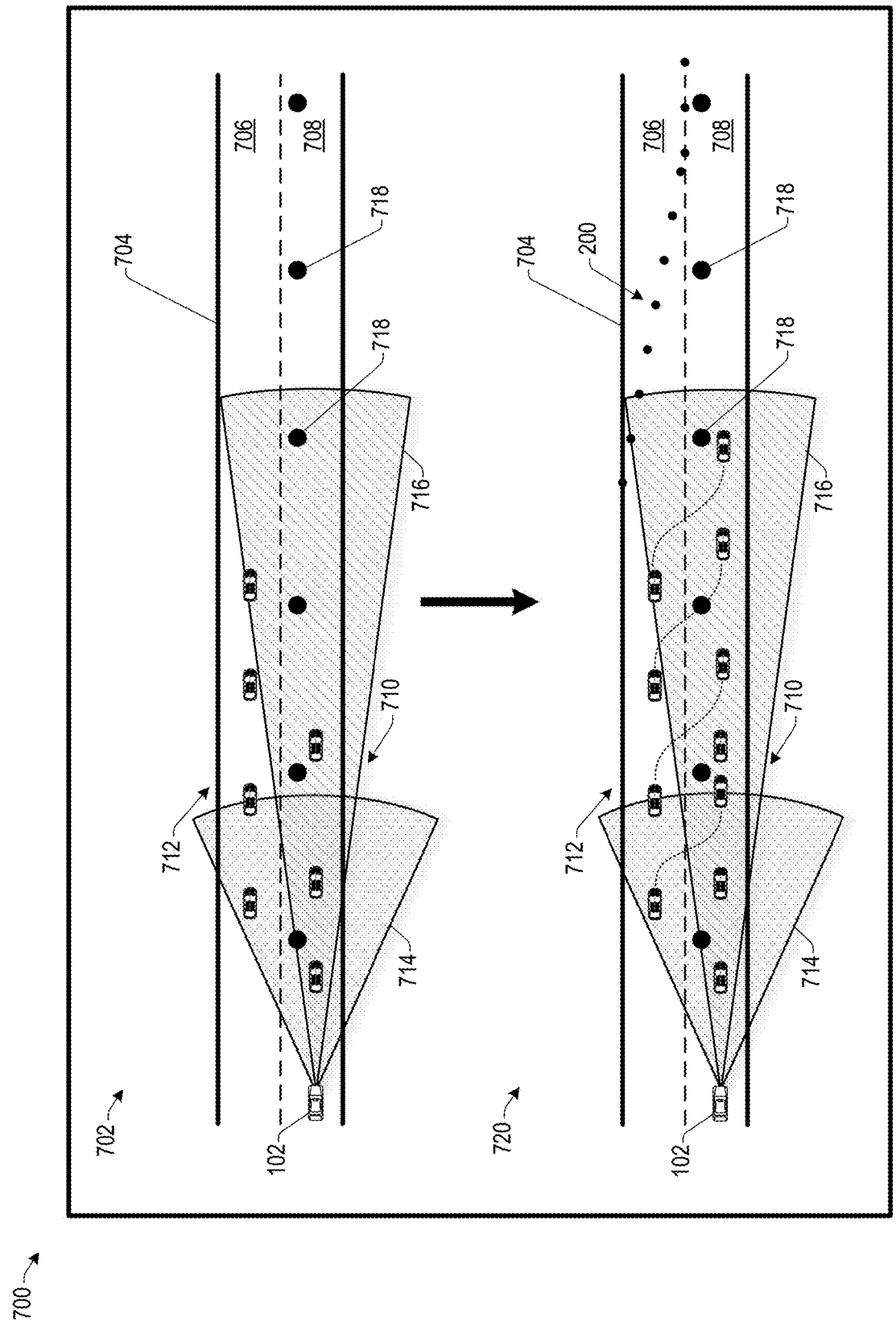
FIG. 7 illustrates an example of an environmental anomaly according to some implementations.

FIG. 7 illustrates an example 700 of an environmental anomaly according to some implementations. In this example, at 702 a first condition of a road 704 includes traffic in both a left lane 706 and a right lane 708. The vehicle 102 is traveling on the road 704 in the right lane 708 with a first plurality of other vehicles 710 in the right lane 708 and a second plurality of other vehicles 712 in the left lane 706. The vehicle 102 includes sensors that provide a first field of view 714, and second field of view 716. The sensor coverage area i.e., predefined road segments of the road 704 are determined by dividing the road 704 into a plurality of waypoints 718. The density of the vehicles 710, 712 may be continuously monitored based on the waypoints 718 by using the vehicle trajectories and mean effective speed within the respective segments.

As illustrated at 720, when an event occurs for example an unexpected blockage of the left lane 706, as indicated at 722, the plurality of vehicles 712 in the left lane 706 start merging to the right lane 708. As more and more vehicles merge into the right lane 708, the density within each segment designated by the waypoints 718 also increases. This is indicated in the recognition data as an environmental anomaly that can affect speed prediction. Consequently, the uncertainty of the prediction model would be expected to increase as a result of the anomaly.

Figure 8:
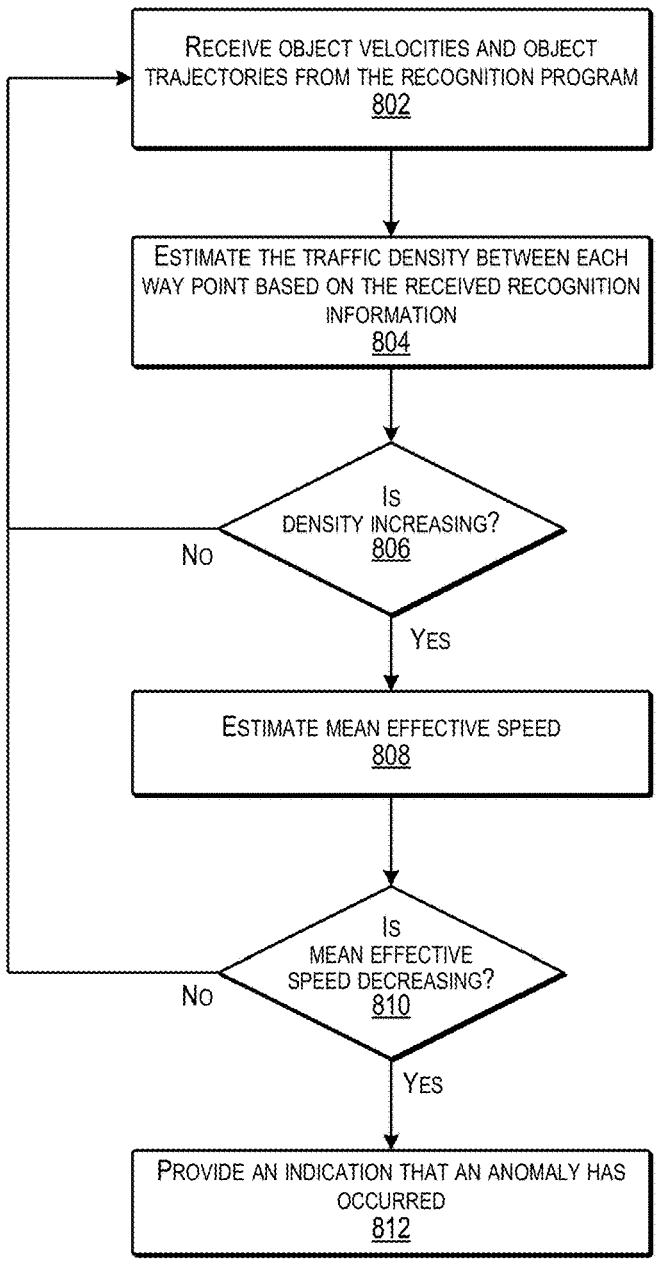
FIG. 8 is a flow diagram illustrating an example process for detecting an anomaly according to some implementations.

FIG. 8 is a flow diagram illustrating an example process 800 for detecting an anomaly according to some implementations. In some examples, the process 800 may be executed by the system 100 discussed above and may correspond to the example of FIG. 7. For example, the process 800 may be executed by the integrated ECU 104, such as by execution of the processing management program 208. For instance, as the system continuously monitors the traffic density within a set of waypoints, the occurrence of an anomaly that affects the travel path of the vehicle 102 can be detected as shown by the process of FIG. 8. The integrated ECU 104 may verify whether the traffic density is increasing incrementally from the previous time step, and may then estimate the mean effective speed of the road segment and determine whether the speed is incrementally decreasing for the lane in which the vehicle 102 is traveling. If both conditions are met, the integrated ECU 104 may determine that a significant anomaly has occurred in the left lane, which can affect the speed prediction system.

At 802, the integrated ECU 104 may receive object velocities and object direct trajectories from the recognition program. For example, the recognition information received from the recognition program may include information about the object velocities and object trajectories in the environment surrounding the vehicle.

At 804, the integrated ECU 104 may estimate the traffic density between each waypoint based on the received recognition information.

At 806, the integrated ECU 104 may determine whether the traffic density is increasing. If so, the process goes to 808. If not, the process returns to 802 to wait for subsequent recognition information to be received.

At 808, when the traffic density is determined to be increasing, the integrated ECU 104 may estimate the mean effective speed along the road segments between the waypoints.

At 810, the integrated ECU 104 may determine whether the traffic mean effective speed is decreasing. If so, the process goes to 812. If not, the process returns to 802 to wait for subsequent recognition information to be received.

At 812, based on determining that the mean effective speed is decreasing and that the traffic density is increasing, the integrated ECU 104 may provide an indication that an anomaly has occurred.

Figure 9:
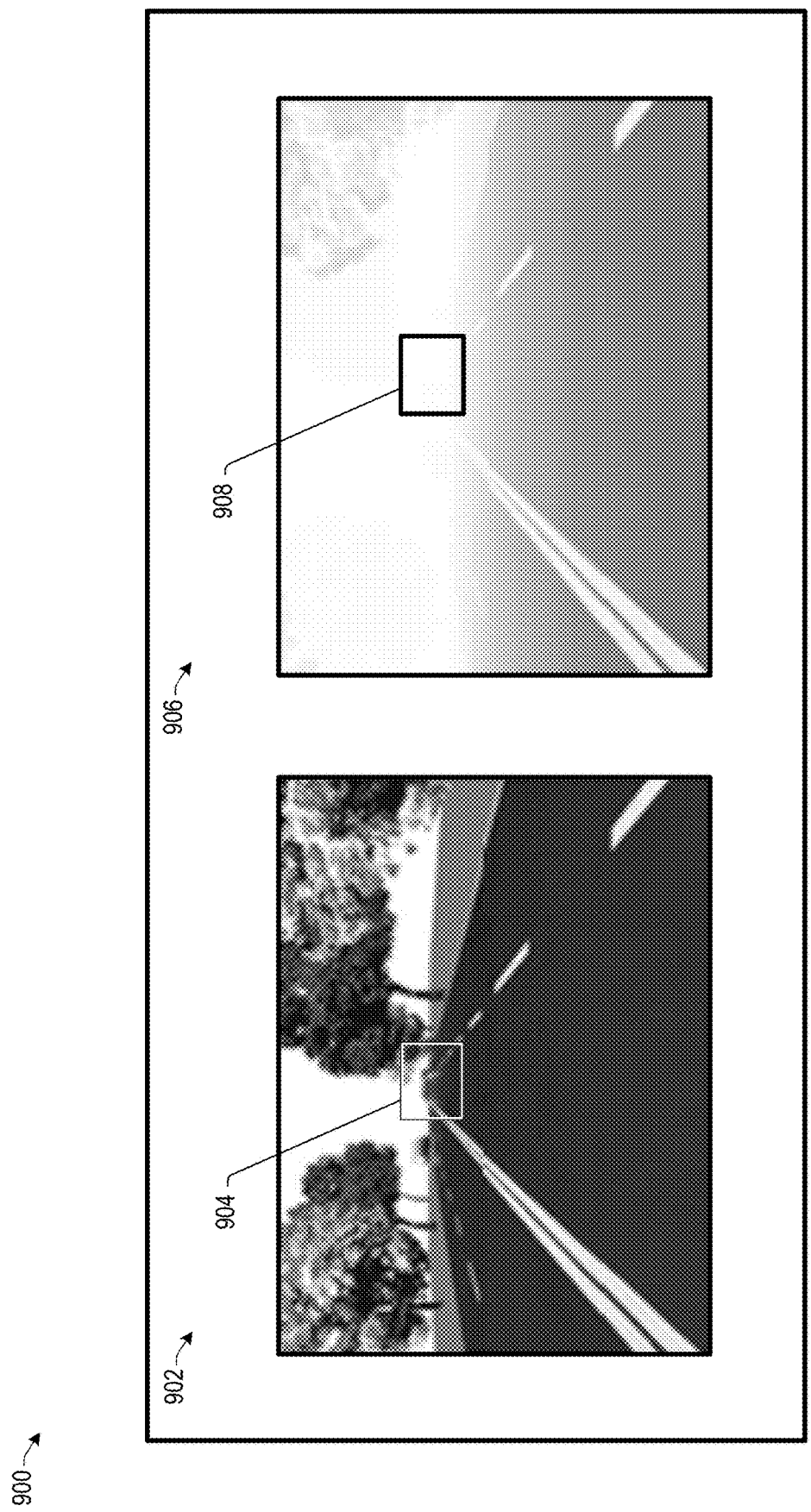
FIG. 9 illustrates an example of an environmental anomaly according to some implementations.

FIG. 9 illustrates an example 900 of an environmental anomaly according to some implementations. In this example, an adverse weather condition anomaly is detected. For example, as illustrated at 902, the vehicle camera may initially have a clear view of the traffic in front of the vehicle as indicated at 904. Subsequently, as indicated at 906, suppose that the vehicle continues to travel on the road and encounters heavy fog as indicated at 908, which limits the view of the vehicle camera with respect to the traffic in front of the vehicle. Accordingly, based on the images received from the camera indicating that fog is obscuring the view in front of the vehicle, the recognition information may be interpreted as indicating that an environmental anomaly has occurred. Furthermore, while this example is directed to detect an anomaly of an adverse weather condition that includes heavy fog, in other examples any of numerous other types of weather conditions may also cause an anomaly to be detected such as rain, snow, dust, and the like.

The onboard sensors and the recognition program provide the integrated ECU 104 with recognition information regarding the objects in front of the vehicle 102. Multi-sensor fusion is one technique that may be used to verify an anomaly caused by an adverse weather condition. Here for example, a vehicle at a certain distance ahead in normal condition may be detected by both a camera and radar. Whereas, in heavy fog conditions the detection range of the camera is substantially reduced, and only the radar sensor might then be able to detect the vehicle in front of the vehicle 102. As part of the multi-sensor fusion, the detection results of the radar sensor and the camera may be compared and the camera performance for other road features such as lane markers may be verified. If both conditions are met, an adverse weather condition may be determined to be an anomaly that affects the speed prediction uncertainty. As one example, the integrated ECU 104 may estimate the adversity of the weather condition based on an amount of the reduction in detection range of the camera sensor.

Figure 10:
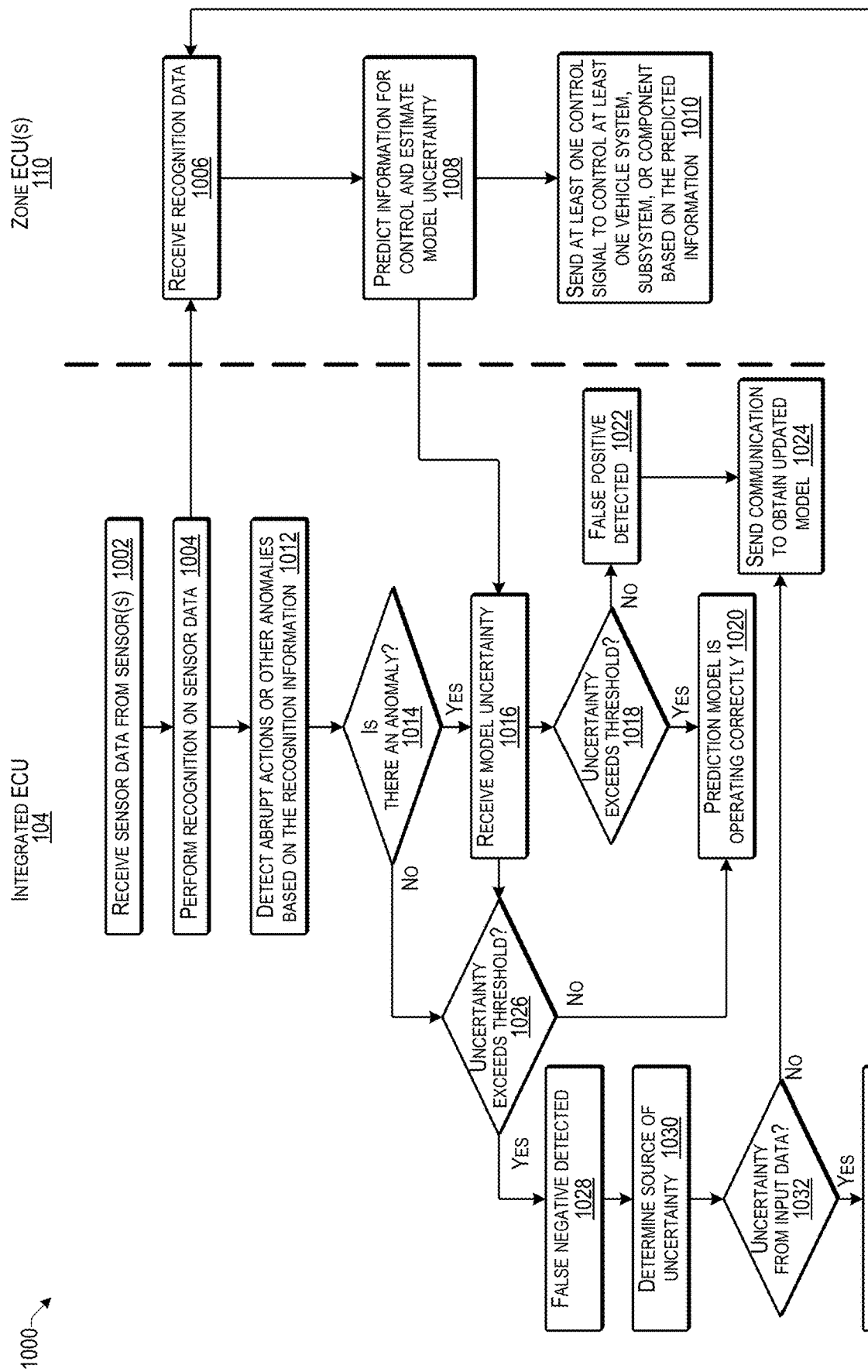
FIG. 10 is a flow diagram illustrating an example process including determining a false negative based on prediction model uncertainty according to some implementations.

FIG. 10 is a flow diagram illustrating an example process 1000 including determining a false negative based on prediction model uncertainty according to some implementations. In some examples, the process 1000 may be executed by the system 100 discussed above. For example, a portion of the process 1000 may be executed by the integrated ECU 104, and another portion of the process 1000 may be executed by the zone ECU(s) 110, as indicated by the vertical dashed line separating the respective operations. Furthermore, while in this example, certain functions are being illustrated as being performed by one or the other of the ECUs 104 or 110, respectively, it will be readily apparent to those of skill in the art having the benefit of the disclosure herein that some or all of the functions may be performed by the other one of the ECUs 104 or 110.

In this example, the system may consider the case of a false negative. For instance, the system continuously monitors the uncertainty value feedback from the prediction model. As one condition, even if an anomaly is not detected, the system may receive the uncertainty information from the prediction model and compare the uncertainty value with the predefined uncertainty threshold. If the uncertainty is greater than threshold, the system may generate a false negative flag, or other indication of a false negative, which may indicate, for example, that the inputs to the prediction model may need to be adjusted or the like.

At 1002, the integrated ECU 104 may receive sensor data from the sensors. For example, as discussed above, the integrated ECU may receive sensor data such as camera images, radar information, lidar information, or the like.

At 1004, the integrated ECU 104 may perform recognition on the received sensor data. For example, as is known in the art the integrated ECU may use recognition algorithms and/or machine learning models for recognizing objects, street signs, traffic signals, pedestrians, and the like in the area surrounding the vehicle. The recognition information may be sent to the zone ECU 110.

At 1006, the zone ECU 110 may receive the recognition information from the integrated ECU 104.

At 1008, the zone ECU 110 may input the recognition information into the prediction model to predict information for control of one or more systems, subsystems, or components of the vehicle. The prediction model may also provide an estimate of model uncertainty as part of its output.

At 1010, the zone ECU 110 may send at least one control signal to control at least one vehicle system, subsystem, or component based on the prediction information output by the prediction model.

At 1012, in parallel with the operations performed on the zone ECU 110, the integrated ECU 104 may analyze the recognition information determined at 1004 to detect any abrupt actions or other environmental anomalies based on the recognition information.

At 1014, the integrated ECU 104 may determine whether an anomaly is detected in the recognition information. If so, the process goes to 1016. If not, the process goes to 1026 to check for a false negative.

At 1016, the integrated ECU may receive the prediction model uncertainty from the zone ECU 110. For example, zone ECU 110 may be configured to automatically send the uncertainty information to the integrated ECU 104 each time the prediction model outputs a prediction based on received recognition data.

At 1018, the integrated ECU 104 may compare the model uncertainty value with a predefined uncertainty threshold to determine whether the received model uncertainty value exceeds the uncertainty threshold. If so, the process goes to 1020. If not, the process goes to 1022.

At 1020, when the uncertainty value exceeds the uncertainty threshold, the prediction model is assumed to be working as desired. As one example, this may be due to the prediction model being a simple approximation of real-world phenomenon that might not work accurately outside of its designed domain as defined during the model training by the training dataset.

At 1022, on the other hand, if the uncertainty value is less than the uncertainty threshold when an anomaly has been detected, the prediction model may be considered to be working incorrectly (i.e., a false positive is detected). In this case, it may be desirable to update the prediction model for improving the accuracy of the prediction model in the case of an occurrence of the type of anomaly identified at 1014.

At 1024, the integrated ECU 104 may send a communication to obtain an updated prediction model. For example, the prediction model may be retrained by the service computing device 108 using the collected sensor data and/or recognition data as a part of the training data used for updating the prediction model. The service computing device 108 may retrain the prediction model using an updated training data set and verify the model's performance using an updated test data set prior to sending the updated model to the vehicle 102. Alternatively, in other examples, an updated model may already be present in a model library maintained by the service computing device 108 as discussed above.

At 1026, when there is not an anomaly detected, the integrated ECU 104 may determine whether the uncertainty exceeds the threshold uncertainty. If the threshold is not exceeded, the model is assumed to be functioning correctly, and the process goes to 1020. If the threshold is exceeded, the process goes to 1028.

At 1028, when the uncertainty exceeds the uncertainty threshold and an anomaly has not been detected, the integrated ECU 104 may indicate that a false negative has been detected, such as by setting a false negative flag in association with the input data that was input to the prediction model.

At 1030, when a false negative is detected, the integrated ECU 104 may attempt to determine the source of uncertainty, such as by verifying the input data using a statistical method such as input covariance information. As one example, if the covariance for certain input values is outside of a gated threshold, the input data may be updated. For example, if the error in input is due to an irrecoverable fault in a sensor, the sensor information may be passively monitored by the integrated ECU 104 (e.g., by execution of the data processing program 208) and, as an example, information to repair the sensor may be provided to a vehicle occupant or other party responsible for vehicle maintenance. In this case, the sensor data input to the prediction model might be ignored, or the prediction model output might not be used for vehicle control. As another example, the error in the inputs to the prediction model may be temporary and/or due to noise in the data. In this situation, the covariance of the input may be continuously monitored and, once the covariance is recovered, the input data may be updated for prediction model. As another example, referring to the example of FIG. 7, suppose that the road work that caused the blockage of the left lane is complete, and the left lane is free to use. If map data is not updated to reflect this, the uncertainty may increase.

At 1030, the integrated ECU 104 may attempt to determine the source of the uncertainty, such as by applying a statistical method to input information based on determining a covariance.

At 1032, the integrated ECU 104 may determine whether the uncertainty appears to be from the input data. If so, the process goes to 1034. If not, the process goes to 1024 to request an updated prediction model. For example, if the input data appears to be correct, then the model may need to be updated. As one example, if the input data covariance is higher than a gated threshold, then the integrated ECU 104 may determine that the error is in the prediction model and may generate a communication for obtaining a retrained or otherwise updated model. For instance, the data processing program 208 may record the inputs, model outputs, and actual measured data, and may send this information to the service computing device 108 for use during retraining of the prediction model.

At 1034, the integrated ECU 104 may attempt to update the input data or may determine that a sensor is not functioning properly, or the like. For example, incorrect map information that might be input to the prediction model may be estimated and the map information may be updated.

Figure 11:
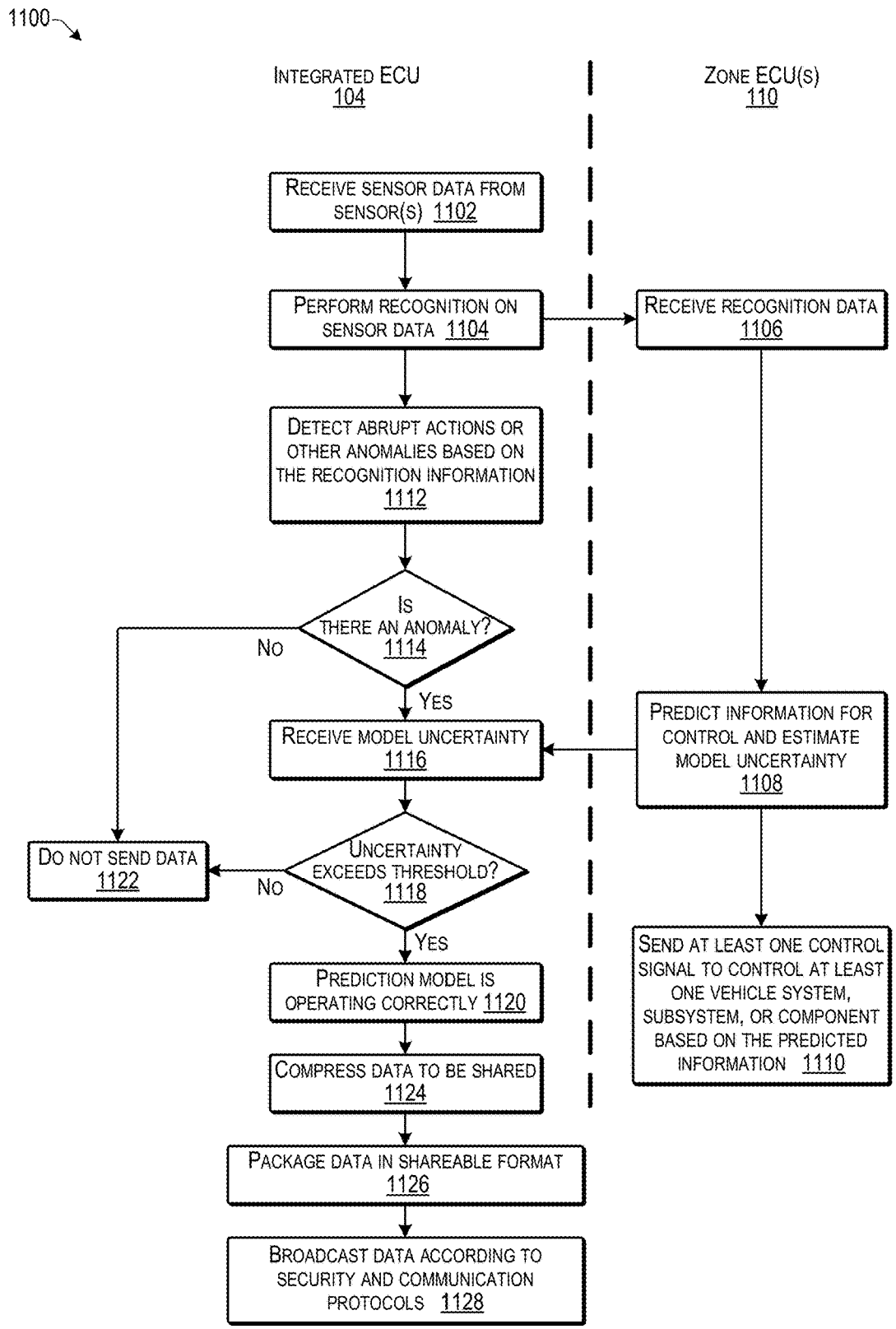
FIG. 11 is a flow diagram illustrating an example process for sharing anomaly information with other vehicles according to some implementations.

FIG. 11 is a flow diagram illustrating an example process 1100 for sharing anomaly information with other vehicles according to some implementations. In some examples, the process 1100 may be executed by the system 100 discussed above. For example, a portion of the process 1100 may be executed by the integrated ECU 104, and another portion of the process 1100 may be executed by the zone ECU(s) 110, as indicated by the vertical dashed line separating the respective operations. Furthermore, while in this example, certain functions are being illustrated as being performed by one or the other of the ECUs 104 or 110, respectively, it will be readily apparent to those of skill in the art having the benefit of the disclosure herein that some or all of the functions may be performed by the other one of the ECUs 104 or 110.

In this example, if the vehicle 102 has vehicle-to-vehicle (V2V) connectivity features on board, the anomaly data detected based on the recognition information can be shared with other V2V connected vehicles. Once the system detects the anomaly in the environment of the vehicle 102, the system may verify whether the prediction model is working correctly. If the prediction model is working correctly, the predicted value and anomaly data may be packaged using communication protocols defined by the V2V communication system and shares the data in the range of V2V communication. Additionally, data can also be shared intermittently with cloud server/edge depending on the request from the cloud server/edge and communication bandwidth requirements using V2X communication protocols.

At 1102, the integrated ECU 104 may receive sensor data from the sensors. For example, as discussed above, the integrated ECU may receive sensor data such as camera images, radar information, lidar information, or the like.

At 1104, the integrated ECU 104 may perform recognition on the received sensor data. For example, as is known in the art the integrated ECU may use recognition algorithms and/or machine learning models for recognizing objects, street signs, traffic signals, pedestrians, and the like in the area surrounding the vehicle. The recognition information may be sent to the zone ECU 110.

At 1106, the zone ECU 110 may receive the recognition information from the integrated ECU 104.

At 1108, the zone ECU 110 may input the recognition information into the prediction model to predict information for control of one or more systems, subsystems, or components of the vehicle. The prediction model may also provide an estimate of model uncertainty as part of its output.

At 1110, the zone ECU 110 may send at least one control signal to control at least one vehicle system, subsystem, or component based on the prediction information output by the prediction model.

At 1112, in parallel with the operations performed on the zone ECU 110, the integrated ECU 104 may analyze the recognition information determined at 1104 to detect any abrupt actions or other environmental anomalies based on the recognition information.

At 1114, the integrated ECU 104 may determine whether an anomaly is detected in the recognition information. If so, the process goes to 1116. If not, the process goes to 1122.

At 1116, the integrated ECU may receive the prediction model uncertainty from the zone ECU 110. For example, zone ECU 110 may be configured to automatically send the uncertainty information to the integrated ECU 104 as an uncertainty value each time the prediction model outputs a prediction based on received recognition data.

At 1118, the integrated ECU 104 may compare the model uncertainty value with a predefined uncertainty threshold to determine whether the received model uncertainty value exceeds the uncertainty threshold. If so, the process goes to 1120. If not, the process goes to 1122.

At 1120, when the uncertainty value exceeds the uncertainty threshold and an anomaly has been detected, the prediction model is assumed to be working as desired. Accordingly, when an anomaly is detected and the model is determined to be working correctly, the vehicle 102 may share information related to the anomaly with other surrounding connected vehicles (e.g., vehicles within a threshold distance of the vehicle 102), such as by utilizing V2X communication protocol.

At 1122, on the other hand, when the integrated ECU 104 determines that there is not an environmental anomaly or determines that the uncertainty does not exceed the threshold, then the integrated ECU 104 does not send information related to the anomaly to other connected vehicles. For example, if there is no anomaly detected, there is no information related to an anomaly to send to the other vehicles. Alternatively, if the uncertainty does not exceed the uncertainty threshold when an anomaly is detected, then the prediction model may not be working correctly and the information related to the anomaly is not sent to the other vehicles.

At 1124, when an anomaly is detected and the uncertainty exceeds the uncertainty threshold, the prediction model is determined to be operating correctly, and in the integrated ECU 104 may compress data to be shared with the other vehicles. For example, the data to be shared with the other vehicles may include information related to the anomaly and prediction information related to a prediction made by the prediction model.

At 1126, the integrated ECU 104 may package the data to be shared into a shareable format accessible by the other vehicles.

At 1128, the integrated ECU 104 may broadcast the shared data according to security and communication protocols in accordance with the V2X standard.

Figure 12:
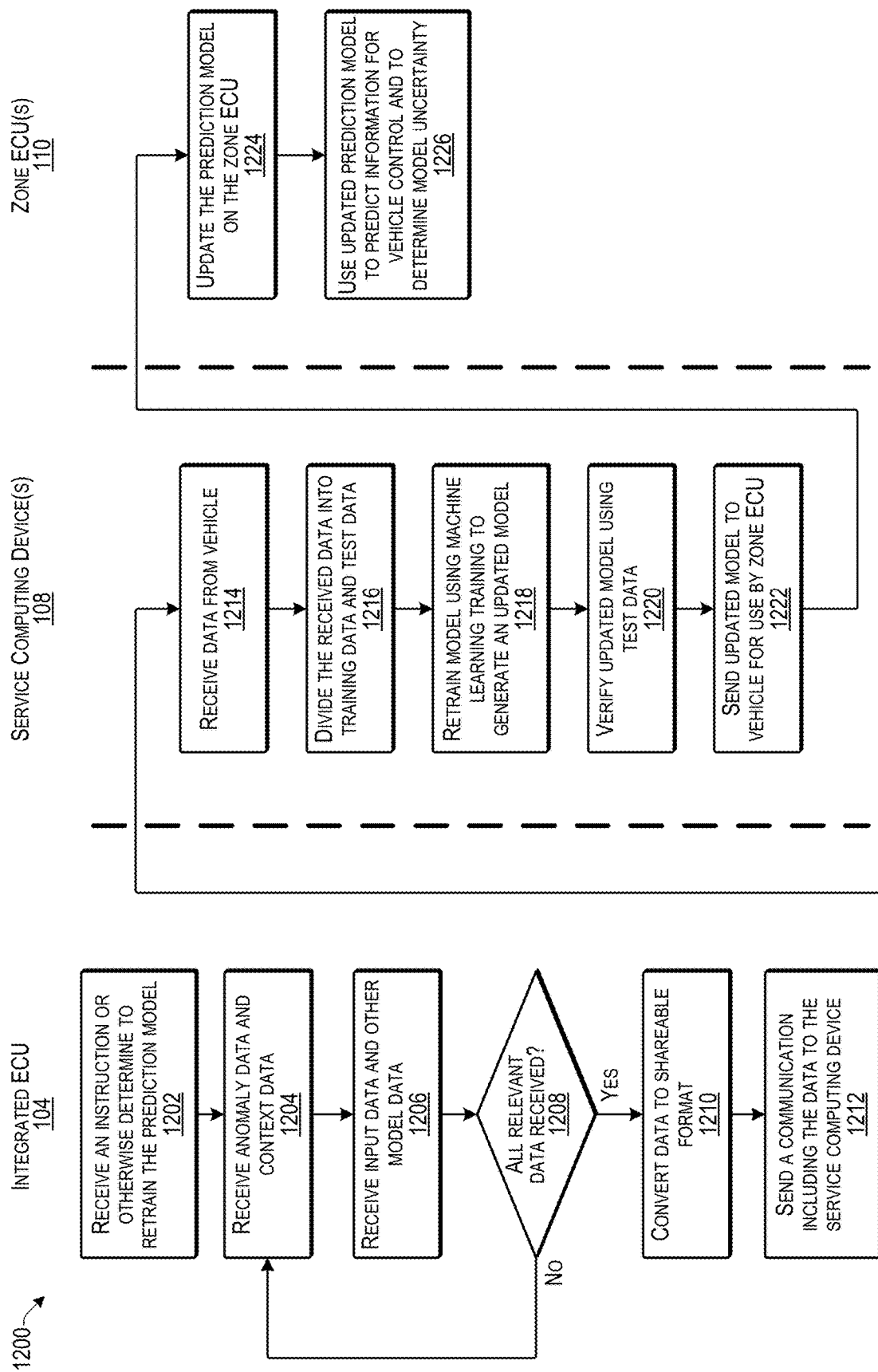
FIG. 12 is a flow diagram illustrating an example process that includes retraining a prediction model according to some implementations.

FIG. 12 is a flow diagram illustrating an example process 1200 that includes retraining a prediction model according to some implementations. In some examples, the process 1200 may be executed by the system 100 discussed above. For example, a portion of the process 1200 may be executed by the integrated ECU 104, another portion of process 1200 may be executed by the service computing device(s) 108, and another portion of the process 1200 may be executed by the zone ECU(s) 110, as indicated by the vertical dashed lines separating the respective operations. Furthermore, while in this example, certain functions are illustrated as being performed by one or the other of the ECUs 104, 110, or the service computing device 108, it will be readily apparent to those of skill in the art having the benefit of the disclosure herein that some or all of the functions may be performed by the other one of the ECUs 104 or 110, or the service computing device 108.

In this example, the system 100 (e.g., the integrated ECU 104) may generate a model retrain request, and the data processing program 208 may record data in a memory associated with the integrated ECU 104. The stored data may include context or anomaly information, vehicle dynamic information, input parameter information for inputs to the prediction model 222, and the output information indicating the outputs of the prediction model 222 are collected and stored in-ECU memory such as SSD until the anomaly is no more detected. Once the data is collected the integrated ECU 104 can share the data with the service computing device 108, either in real time or later when the vehicle 102 is not being used. The service computing device 108 may verify the received anomaly information and fetch additional data from other vehicles or from a historical database. The service computing device 108 may split the consolidated data into a training data set and a test set based on predefined percentile and may use the training data set to retrain the model using machine learning techniques. Once the model is retrained, the service computing device 108 may verify the trained model using the test data set and may generate a performance report. If the performance score is greater than the determined threshold, the newly trained model is sent to the vehicle 102, such as through an over-the-air update technology, or through any other suitable communication technique.

The zone ECU 110 may receive the newly trained updated model and may deploy the updated model in place of the prediction model that was determined to not be operating correctly. Furthermore, any safety critical prediction models are replaced only after the vehicle has been parked, while any non-safety critical prediction models may be replaced in runtime, such as based on approval of the vehicle operator and with sufficient warning regarding any implications associated with the replacement procedure.

At 1202, the integrated ECU 104 may receive an instruction or may otherwise determine to retrain the prediction model executing on one of the zone ECUs 110.

At 1204, the integrated ECU 104 may obtain or otherwise receive anomaly data and context data for the prediction model that has been determined to not be operating correctly.

At 1206, the integrated ECU 104 may obtain or otherwise receive input data and other model data for the prediction model that has been determined to not be operating correctly.

At 1208, the integrated ECU 104 may determine whether all relevant data has been received. For example, if a false positive has been detected, the integrated ECU 104 may attempt to send, to the service computing device 108, anomaly information and, in the case of, e.g., speed prediction, may send speed data indicating the actual speed of the vehicle that may be used as part of the training data. If all relevant data has been received, the process goes to 1210. If not all relevant data has been received, the process may return to 1204 to attempt to gather additional data.

At 1210, the integrated ECU 104 may convert the data to a shareable format.

At 1212, the integrated ECU 104 may send a communication including the collected data to the service computing device 108.

At 1214, the service computing device 108 may receive the collected data in the communication from the integrated ECU 104.

At 1216, the service computing device 108 may divide the data into training data and test data.

At 1218, the service computing device 108 may update the prediction model using the received data. For instance, as is known in the art, the training data may be used to train the prediction model to generate an updated prediction model. In some cases, the model parameters may be updated based on the detected anomaly and/or other vehicle information such as vehicle speed information, or the like.

At 1220, the service computing device 108 may verify the updated prediction model using the test data portion of the received data.

At 1222, following verification of the updated model, the service computing device 108 may send the updated model to the vehicle, such as to the integrated ECU 104, or directly to the corresponding zone ECU 110. As one example, the updated model may be provided to the zone ECU 110 through an over-the-air update technique or any other suitable technique.

At 1224, the zone ECU 110 may update the prediction model on the zone ECU by deploying the updated model.

At 1226, the zone ECU 110 may use the updated prediction model to predict information for vehicle control and to determine model uncertainty.

Figure 13:
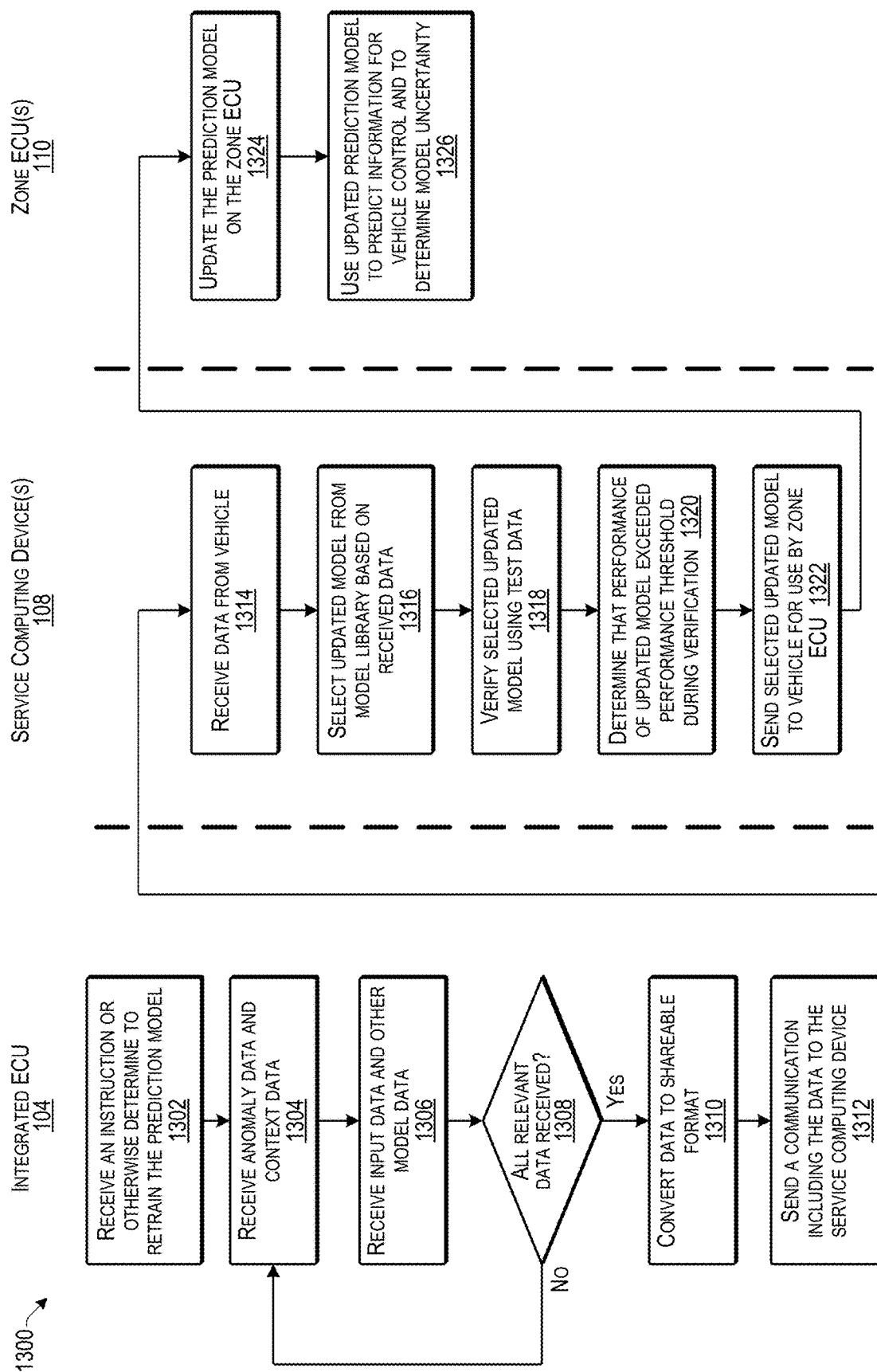
FIG. 13 is a flow diagram illustrating an example process that includes obtaining an updated prediction model from the model library according to some implementations.

FIG. 13 is a flow diagram illustrating an example process 1300 that includes obtaining an updated prediction model from the model library according to some implementations. In some examples, the process 1200 may be executed by the system 100 discussed above. For example, a portion of the process 1300 may be executed by the integrated ECU 104, another portion of process 1300 may be executed by the service computing device(s) 108, and another portion of the process 1300 may be executed by the zone ECU(s) 110, as indicated by the vertical dashed lines separating the respective operations. Furthermore, while in this example, certain functions are being illustrated as being performed by one or the other of the ECUs 104, 110, or the service computing device 108, it will be readily apparent to those of skill in the art having the benefit of the disclosure herein that some or all of the functions may be performed by the other one of the ECUs 104 or 110, or the service computing device 108.

In this example, to reduce the time for receiving an updated prediction model at the vehicle 102, the service computing device 108 may continually receive relevant data from various connected autonomous vehicles that are equipped with the data processing program 208. The data received by the service computing device 108 may be used to continually update one or more prediction models maintained in the model library 118. Accordingly, when the vehicle 102 sends a request for an updated prediction model for a particular zone ECU 110, the service computing device may receive the data related to the anomaly and prediction model inputs that are included in the communication from the vehicle 102. Based on anomaly condition information and received model input and context information, an already updated prediction model is fetched from the model library and verified using a test data set that may include the data received from the vehicle 102. After the updated model has been verified using test data, the service computing device 108 may generate a performance report. If the performance score determined from the verification of the model is greater than a predetermined threshold, the updated prediction model is sent to the vehicle 102, such as through an over-the-air update or other suitable communication technology.

The zone ECU 110 that receives the updated prediction model may replace the faulty prediction model with the received updated prediction model. As mentioned above any safety critical prediction models are only replaced when the vehicle has been parked, while non-safety-critical prediction models may be replaced in runtime, such as based on approval of the vehicle operator or other occupant and with sufficient warning regarding any implications of the replacement procedure.

At 1302, the integrated ECU 104 may receive an instruction or may otherwise determine to retrain the prediction model executing on one of the zone ECUs 110.

At 1304, the integrated ECU 104 may obtain or otherwise receive anomaly data and context data for the prediction model that has been determined to not be operating correctly.

At 1306, the integrated ECU 104 may obtain or otherwise receive input data and other model data for the prediction model that has been determined to not be operating correctly.

At 1308, the integrated ECU 104 may determine whether all relevant data has been received. For example, if a false positive has been detected, the integrated ECU 104 may attempt to send, to the service computing device 108, anomaly information and, in the case of, e.g., speed prediction, may send speed data indicating the actual speed of the vehicle that may be used as part of the training data. If all relevant data has been received, the process goes to 1310. If not all relevant data has been received, the process may return to 1304 to attempt to gather additional data.

At 1310, the integrated ECU 104 may convert the data to a shareable format.

At 1312, the integrated ECU 104 may send a communication including the collected data to the service computing device 108.

At 1314, the service computing device 108 may receive the collected data in the communication from the integrated ECU 104.

At 1316, the service computing device 108 may select an updated model from the model library based on the received data received from the vehicle 102. For example, the service computing device may generate the model library based on anomaly types and store a plurality of trained prediction models in the model library. Based on detected anomaly, a corresponding already trained model may be selected from the model library in real time and returned to the vehicle 102.

At 1318, the service computing device 108 may verify the updated prediction model using test data that includes at least a portion of the received data received from the vehicle 102.

At 1320, the service computing device 108 may generate a performance report. If the performance score determined from the verification of the model is greater than a predetermined threshold, the updated model is sufficiently trained to provide to the vehicle 102.

At 1322, following verification of the updated model and checking the performance, the service computing device 108 may send the updated model to the vehicle, such as to the integrated ECU 104, or directly to the corresponding zone ECU 110. As one example, the updated model may be provided to the zone ECU 110 through an over-the-air update technique or any other suitable technique.

At 1324, the zone ECU 110 may update the prediction model on the zone ECU by deploying the updated model.

At 1326, the zone ECU 110 may use the updated prediction model to predict information for vehicle control and to determine model uncertainty.

Figure 14:
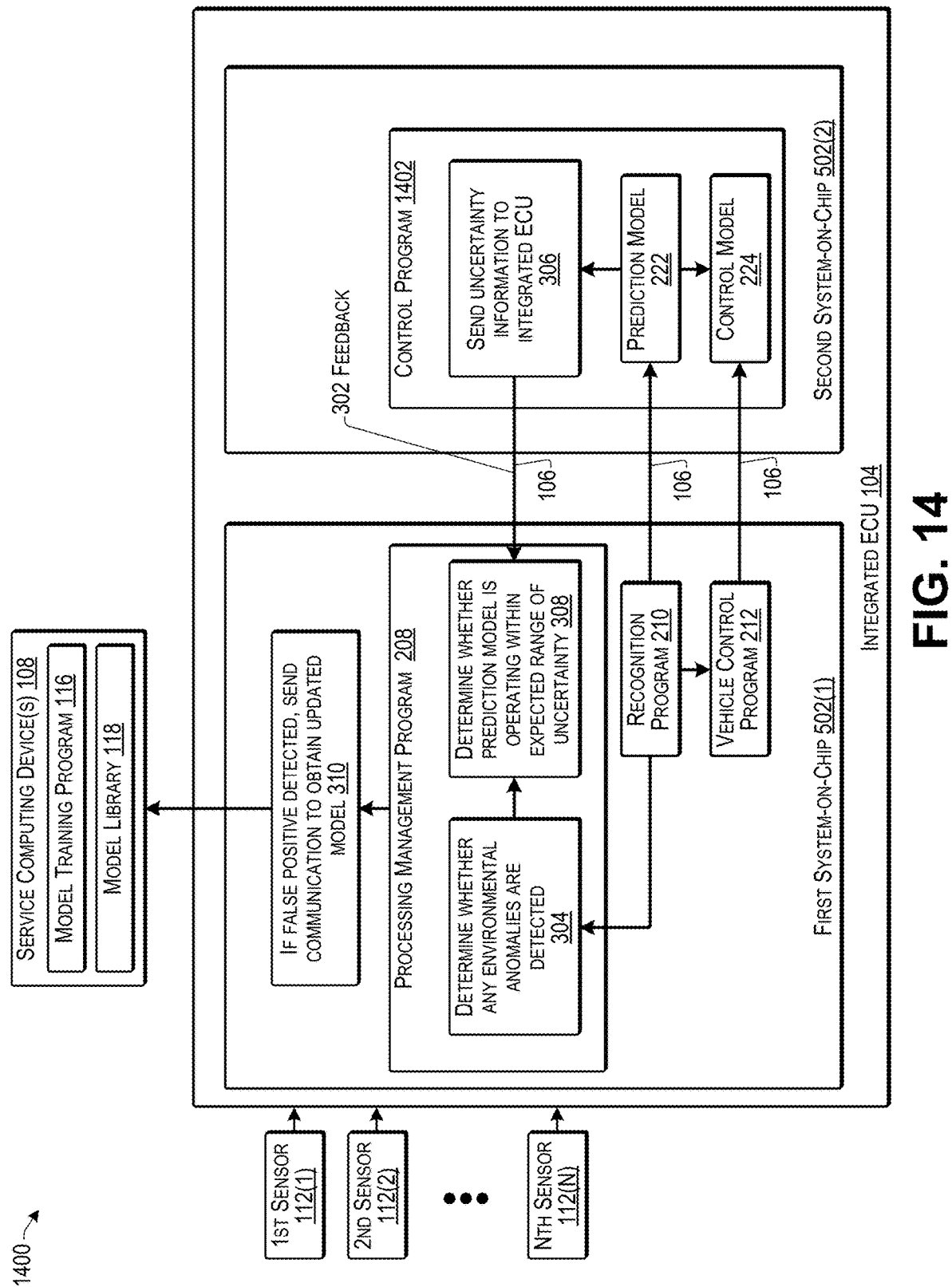
FIG. 14 illustrates an example of feedback from the prediction model according to some implementations.

FIG. 14 illustrates an example 1400 of feedback from the prediction model according to some implementations. In this example, the processing management program 208 is executed on a first system-on-chip 502(1), and the prediction model 222 is executed on a second system-on-chip 502(2), rather than on a zone ECU. The second system-on-chip 502(2) may execute a control program 1402 that provides the uncertainty value from the prediction model 222 to the integrated ECU 104 as at least part of the feedback 302. Accordingly, the feedback 302 from the prediction model 222 is provided from the second system-on-chip 502(2) to the first system-on-chip 502(1), such as through a high speed bus or other communication link 106.

Figure 15:
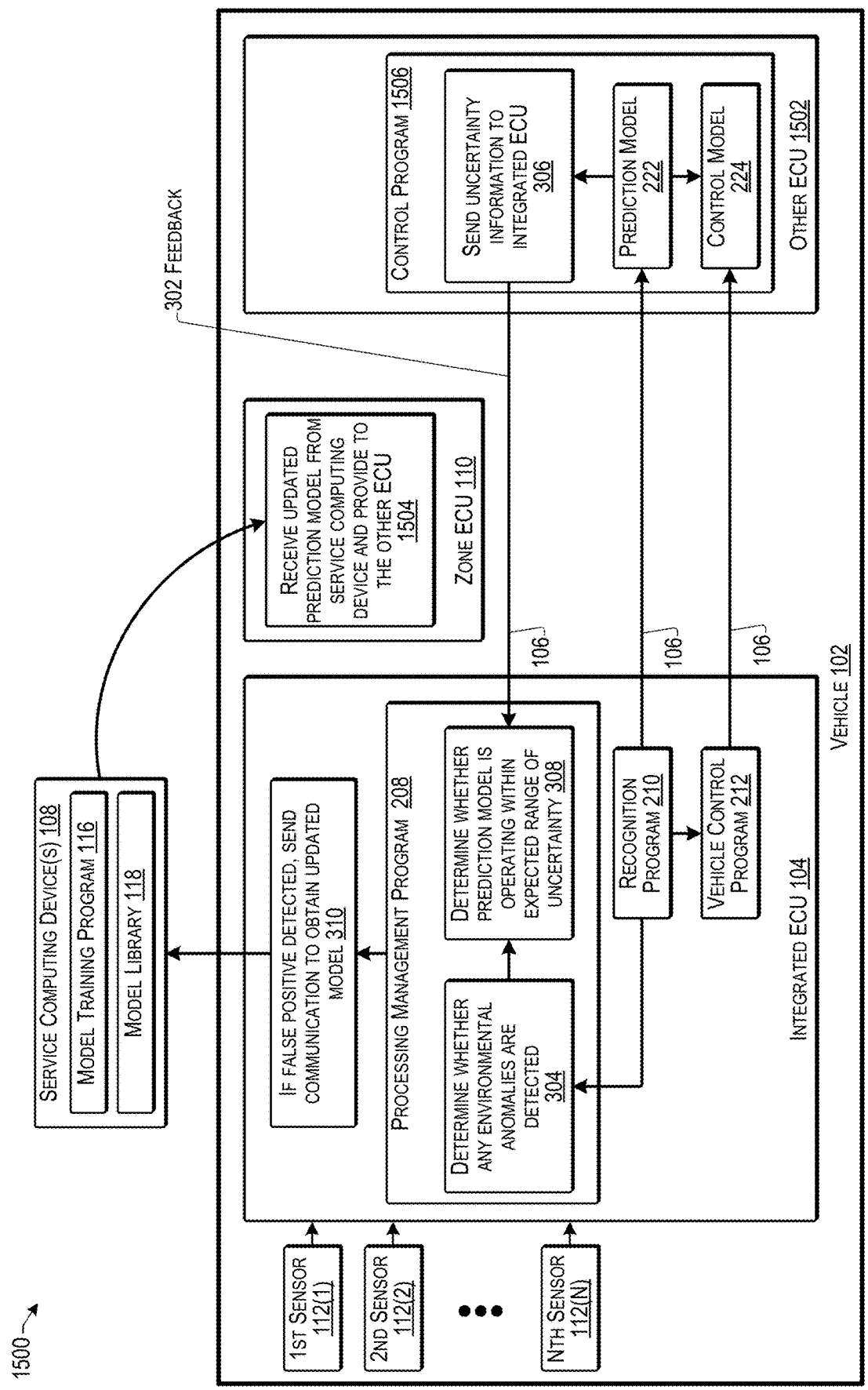
FIG. 15 illustrates an example of feedback from the prediction model according to some implementations.

FIG. 15 illustrates an example 1500 of feedback from the prediction model according to some implementations. In this example, the processing management program 208 is executed on the integrated ECU 104, and the prediction model 222 is executed on another ECU 1502, rather than on a zone ECU. Accordingly, the feedback 302 from the prediction model 222 is provided from the other ECU 1502(2) to the integrated ECU 104, such as through the communication links 106. Further, as indicated at 1504, the zone ECU 110 may receive the updated prediction model from the service computing device. The other ECU 1502 may execute a control program 1506 that provides the uncertainty value from the prediction model 222 to the integrated ECU as at least part of the feedback 302.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types.

These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system for evaluating or updating a prediction model of autonomous vehicle behavior, the system comprising:
   one or more processors configured by executable instructions to perform operations comprising:
      receiving sensor data from sensors on board a vehicle;
      based at least on the sensor data indicating an anomaly has occurred and is affecting a travel path of the vehicle, comparing an uncertainty threshold with an uncertainty value associated with a prediction model, wherein the uncertainty value is indicative of a difference between a predicted value predicted by the prediction model and an actual measured value related to at least one operation parameter of the vehicle, and wherein, prior to detecting the anomaly, the uncertainty threshold indicates a level of uncertainty below which the prediction model is assumed to be functioning correctly; and
      based at least on determining that the anomaly has occurred and that the uncertainty value associated with the prediction model is-within still below the uncertainty threshold, determining that the prediction model is not functioning correctly, and sending a communication for obtaining an updated prediction model.

2. The system as recited in claim 1, wherein the anomaly includes at least one of:
   construction, an accident, a road blockage that is different from information on a map being used by the vehicle for navigation, a change in weather that affects a sensing ability of one or more of the sensors on board the vehicle, or a change in a driving condition of the vehicle detected by one or more of the sensors on board the vehicle.

3. The system as recited in claim 1, wherein the one or more processors comprise:
   at least one integrated electronic control unit (ECU) and a plurality of zone ECUS,
   wherein the integrated ECU receives the sensor data,
   wherein the plurality of zone ECUs receive recognition information processed by the integrated ECU, and
   wherein one or more of the zone ECUs control the at least one operation parameter of the vehicle base at least in part on an output of the prediction model, wherein the prediction model is configured to at least predict behavior of the vehicle.

4. The system as recited in claim 3, wherein the at least one integrated ECU performs the comparing the uncertainty threshold with the uncertainty value to determine whether to request an updated prediction model based on a result of the comparing.

5. The system as recited in claim 1, wherein requesting the updated prediction model comprises at least one of:
   sending data to a computing device remote from the vehicle to request that the computing device retrain the prediction model to obtain an updated prediction model; or
   sending data to the computing device to request that the computing device provide a trained model from a model library maintained by the computing device.

6. The system as recited in claim 1, the operations further comprising:
   subsequently, based at least on determining that the anomaly does not exist and that the uncertainty value from the prediction model exceeds the threshold, determining that a false negative is detected, and
   based at least on identifying an error in model input information, updating input data for the prediction model.

7. The system as recited in claim 1, the operations further comprising:
   based at least on determining that another anomaly is detected, determining that the model is working correctly based on the uncertainty value exceeding the uncertainty threshold; and
   transmitting information related to the anomaly to one or more other vehicles in a vicinity of the vehicle.

8. The system as recited in claim 1, the operations further comprising:
   based at least on determining that the anomaly has occurred and that the uncertainty value is within the uncertainty threshold, detecting a false positive;
   sending information related to the anomaly and actual operation parameters of the vehicle to the remote computing device for retraining of the model, wherein the retraining of the model includes updating model parameters based on the information related to the anomaly and the actual operation parameters of the vehicle; and
   receiving the retrained model at the vehicle as an updated prediction model.

9. The system as recited in claim 1, wherein:
   the computing device maintains a model library including a plurality of models trained based on anomaly types; and
   based on the detection of the anomaly, the computing device selects an updated model from the model library to provide to the vehicle as an updated prediction model.

10. A method comprising:
    receiving, by one or more processors, sensor data from a plurality of sensors on board a vehicle;
    based at least on the sensor data indicating an anomaly has occurred and is affecting a travel path of the vehicle, comparing, by the one or more processors, an uncertainty threshold with an uncertainty value associated with a prediction model, wherein the uncertainty value is indicative of a difference between a predicted value predicted by the prediction model and an actual measured value related to at least one operation parameter of the vehicle, and wherein, prior to detecting the anomaly, the uncertainty threshold indicates a level of uncertainty below which the prediction model is assumed to be functioning correctly; and
    based at least on determining that the anomaly has occurred and that the uncertainty value associated with the prediction model is still below the uncertainty threshold, determining that the prediction model is not functioning correctly, and sending, by the one or more processors, a communication for obtaining an updated prediction model.

11. The method as recited in claim 10, wherein the anomaly includes at least one of:
construction, an accident, a road blockage that is different from information on a map being used by the vehicle for navigation, a change in weather that affects a sensing ability of one or more of the sensors on board the vehicle, or a change in a driving condition of the vehicle detected by one or more of the sensors on board the vehicle.

12. The method as recited in claim 10, wherein:
the computing device maintains a model library including a plurality of models trained based on anomaly types; and
based on the detection of the anomaly, the computing device selects an updated model from the model library to provide to the vehicle as an updated prediction model.

13. The method as recited in claim 10, further comprising:
subsequently, based at least on determining that the anomaly does not exist and that the uncertainty value from the prediction model exceeds the threshold, determining that a false negative is detected, and
based at least on identifying an error in model input information, updating input data for the prediction model.

14. The method as recited in claim 10, further comprising:
based at least on determining that another anomaly is detected, determining that the model is working correctly based on the uncertainty value exceeding the uncertainty threshold; and
transmitting information related to the other anomaly to one or more other vehicles in a vicinity of the vehicle.

15. The method as recited in claim 10, further comprising:
based at least on determining that the anomaly has occurred and that the uncertainty value is within the uncertainty threshold, detecting a false positive;
sending information related to the anomaly and actual operation parameters of the vehicle to the remote computing device for retraining of the model, wherein the retraining of the model includes updating model parameters based on the information related to the anomaly and the actual operation parameters of the vehicle; and
receiving the retrained model at the vehicle as an updated prediction model.

16. A non-transitory computer-readable medium including executable instructions, which, when executed by one or more processors, configure the one or more processors to perform operations comprising:
receiving sensor data from sensors on board a vehicle;
based at least on the sensor data indicating an anomaly has occurred and is affecting a travel path of the vehicle, comparing an uncertainty threshold with an uncertainty value associated with a prediction model, wherein the uncertainty value is indicative of a difference between a predicted value predicted by the prediction model and an actual measured value related to at least one operation parameter of the vehicle, and wherein, prior to detecting the anomaly, the uncertainty threshold indicates a level of uncertainty below which the prediction model is assumed to be functioning correctly; and
based at least on determining that the anomaly has occurred and that the uncertainty value associated with the prediction model is still below the uncertainty threshold, determining that the prediction model is not functioning correctly, and sending a communication for obtaining an updated prediction model.

17. The non-transitory computer-readable medium as recited in claim 16, wherein the anomaly includes at least one of:
construction, an accident, a road blockage that is different from information on a map being used by the vehicle for navigation, a change in weather that affects a sensing ability of one or more of the sensors on board the vehicle, or a change in a driving condition of the vehicle detected by one or more of the sensors on board the vehicle.

18. The non-transitory computer-readable medium as recited in claim 16, wherein the one or more processors comprise:
at least one integrated electronic control unit (ECU) and a plurality of zone ECUs,
wherein the integrated ECU receives the sensor data,
wherein the plurality of zone ECUs receive recognition information processed by the integrated ECU, and
wherein one or more of the zone ECUs control the at least one operation parameter of the vehicle base at least in part on an output of the prediction model, wherein the prediction model is configured to at least predict behavior of the vehicle.

19. The non-transitory computer-readable medium as recited in claim 16, wherein requesting the updated prediction model comprises at least one of:
sending data to a computing device remote from the vehicle to request that the computing device retrain the prediction model to obtain an updated prediction model; or
sending data to the computing device to request that the computing device provide a trained model from a model library maintained by the computing device.

20. The non-transitory computer-readable medium as recited in claim 16, the operations further comprising:
subsequently, based at least on determining that the anomaly does not exist and that the uncertainty value from the prediction model exceeds the threshold, determining that a false negative is detected, and
based at least on identifying an error in model input information, updating input data for the prediction model.

* * * * *